US008681354B2

(12) United States Patent
Matsuzaki

(10) Patent No.: US 8,681,354 B2
(45) Date of Patent: Mar. 25, 2014

(54) INFORMATION PROCESSING APPARATUS FOR SETTING A PRINTING ATTRIBUTE TO A HOT FOLDER

(75) Inventor: Masanori Matsuzaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1428 days.

(21) Appl. No.: 11/543,858

(22) Filed: Oct. 6, 2006

(65) Prior Publication Data

US 2007/0086038 A1    Apr. 19, 2007

(30) Foreign Application Priority Data

Oct. 13, 2005    (JP) ................................. 2005-299322

(51) Int. Cl.
*G06F 3/12*    (2006.01)

(52) U.S. Cl.
USPC ........................................ 358/1.15; 358/1.13

(58) Field of Classification Search
USPC ................................ 358/1.1–1.16
See application file for complete search history.

(56) References Cited

U.S. PATENT DOCUMENTS

| | | | | |
|---|---|---|---|---|
| 5,978,560 A * | 11/1999 | Tan et al. | ...................... | 358/1.15 |
| 6,687,018 B1 * | 2/2004 | Leong et al. | .................. | 358/1.15 |
| 7,143,150 B1 * | 11/2006 | Nuggehalli | .................... | 709/221 |
| 7,426,046 B2 | 9/2008 | Shirai et al. | | |
| 2004/0099166 A1 * | 5/2004 | Blom et al. | .................... | 101/483 |
| 2004/0239956 A1 * | 12/2004 | Araumi | ........................... | 358/1.1 |
| 2005/0073717 A1 * | 4/2005 | Arakawa | ....................... | 358/1.15 |
| 2006/0044591 A1 | 3/2006 | Matsuzaki et al. | | |
| 2006/0082802 A1 * | 4/2006 | Furuya | ......................... | 358/1.13 |
| 2007/0086038 A1 | 4/2007 | Matsuzaki | | |

FOREIGN PATENT DOCUMENTS

| | | |
|---|---|---|
| JP | 11-184653 A | 7/1999 |
| JP | 2005115568 | 4/2005 |
| JP | 2005-165773 A | 6/2005 |

OTHER PUBLICATIONS

Japanese Office Action dated Nov. 5, 2010 concerning Japanese Patent Application No. 2005-299322.

* cited by examiner

*Primary Examiner* — Benny Q Tieu
*Assistant Examiner* — Michael Y Tzeng
(74) *Attorney, Agent, or Firm* — Fitzpatrick, Cella, Harper & Scinto

(57) ABSTRACT

According to an information processing method of generating print data to be processed by a printing apparatus, when data is stored in a storage area, the data is transmitted to the printing apparatus by applying a printing attribute corresponding to the storage area. The printing attribute corresponding to the storage area is set, and status information representing the status of the printing apparatus is obtained. The printing attribute is changed to adapt the printing attribute to the obtained status information.

21 Claims, 36 Drawing Sheets

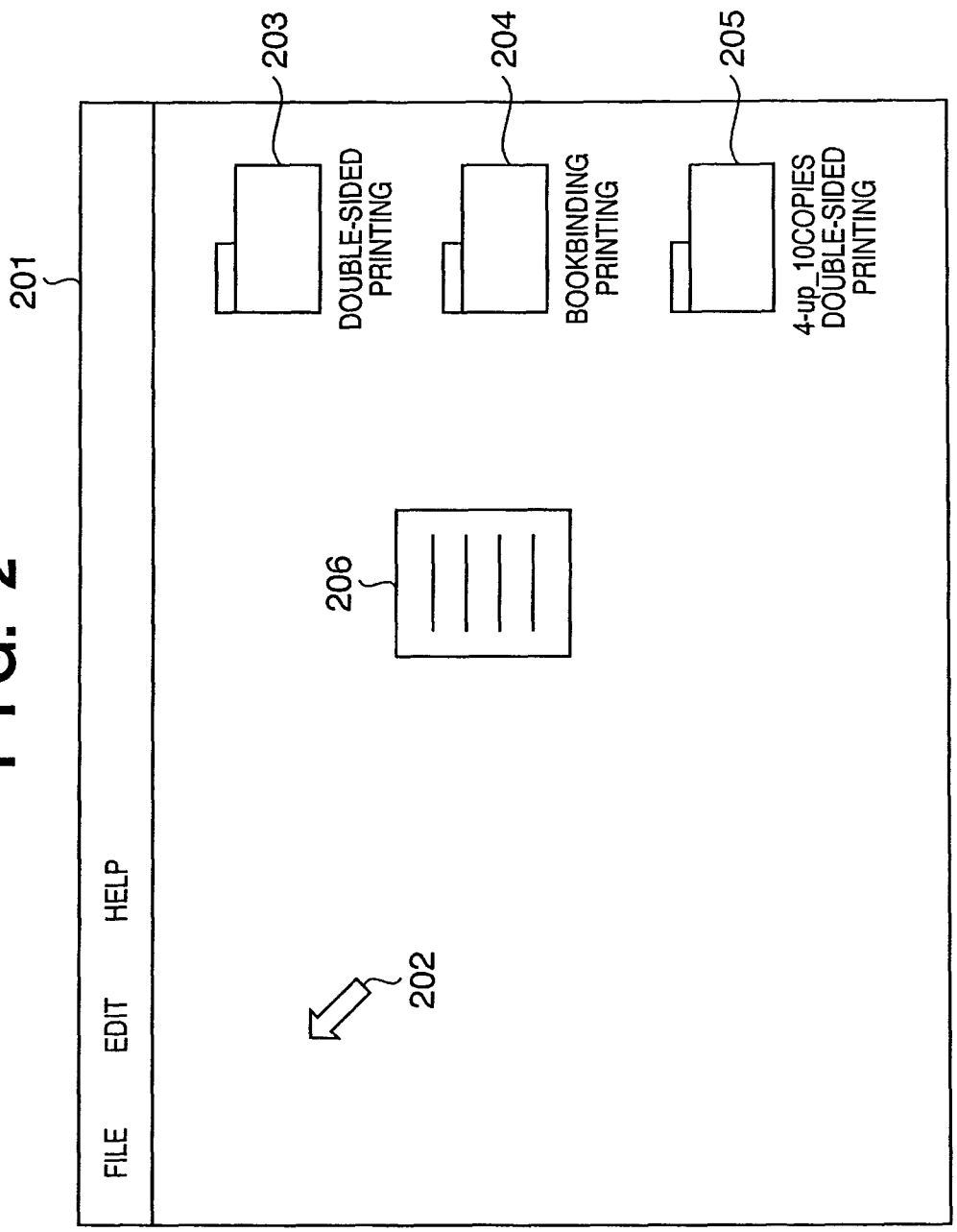

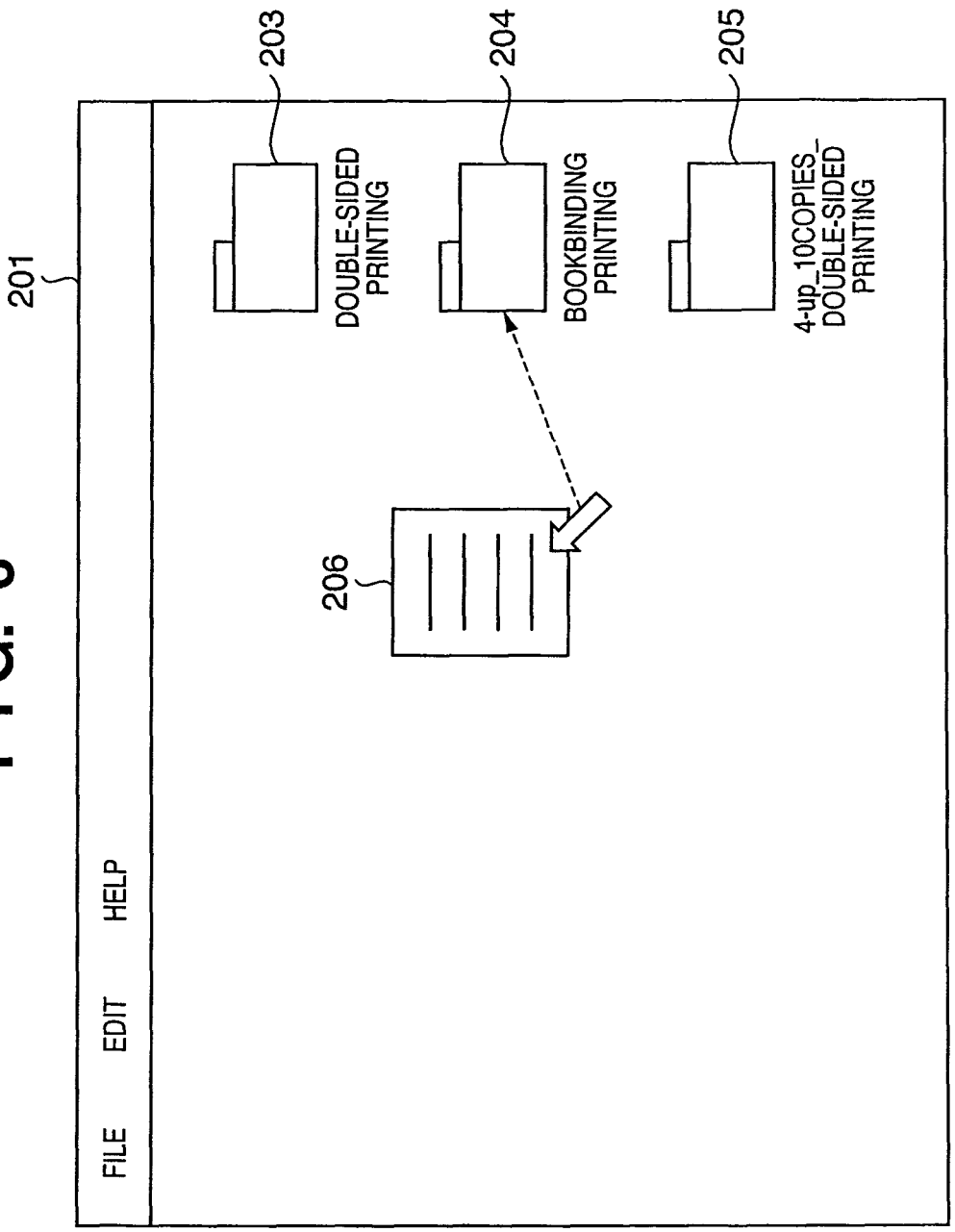

FIG. 9

```
<OutputSize Size = "A4"/> ~901
</OutputSize>
<Media MediaType = "Plain"> ~902
</Media>
<Copies NumOfCopies = "10"> ~903
</Copies>
<Layout PageLayout = "4-up"> ~904
</Layout>
<Plex PlexType = "duplex"/> ~905
</Plex PlexType>
<OutputStyle Finishing = "staple"> ~906
</OutputStyle>
          ⋮
```

FIG. 14A

| PRINT SETTINGS OF HOT FOLDER APPLICATION | DEVICE INFORMATION |
|---|---|
| OUTPUT PAPER SIZE | PAPER INFORMATION |
| PAPER TYPE | |
| RGB SOURCE PROFILE | PROFILE INFORMATION |
| CMYK SIMULATION PROFILE | |
| OUTPUT PROFILE | |
| HALFTONE | SCREEN DATA |
| DISCHARGE METHOD | FINISHER INFORMATION |

FIG. 14B

- Source Profile
  - sRGB
  - gamma 1.8 Monitor
- Simulation Profile
  - JapanColor
  - SWOP
- Destination Profile
  - OutputProfile(Default)
- Halftones
  - Screen1
  - Screen2
  - Error Diffusion
- Cassette1
  - A4 normal
- Cassette2
  - A3 photo paper
- Finisher
  - Finisher-A

FIG. 15

```
<Source Profile>
<Source Profile 1 = "sRGB">
</Source Profile 1>
<Source Profile 2 = "gamma 1.8 Monitor">
</Source Profile 2>
</Source Profile>
<Simulation Profile>
<Simulation Profile 1 = "JapanColor">
</Simulation Profile 1>
<Simulation Profile 2 = "SWOP">
</Simulation Profile 2>
</Simulation Profile>
<Simulation Profile>
<Simulation Profile 1 = "JapanColor">
</Simulation Profile 1>
<Simulation Profile 2 = "SWOP">
</Simulation Profile 2>
</Simulation Profile>
```

FIG. 26

| FOLDER PATH | PRINTER | DEVICE STATUS LIST |
|---|---|---|
| C:¥Document and Setting... | 192.168.0.100 | device_A_001 |
| C:¥Document and Setting... | 192.168.0.150 | device_B_001 |
| C:¥Document and Setting... | 192.168.0.200 | device_C_001 |

| PRINTING ATTRIBUTES | PRINTER | DEVICE STATUS LIST |
|---|---|---|
| A | 192.168.0.100 | device_A_001 |
| B | 192.168.0.150 | device_B_001 |
| C | 192.168.0.200 | device_C_001 |

3101  3102  3103

F I G. 34
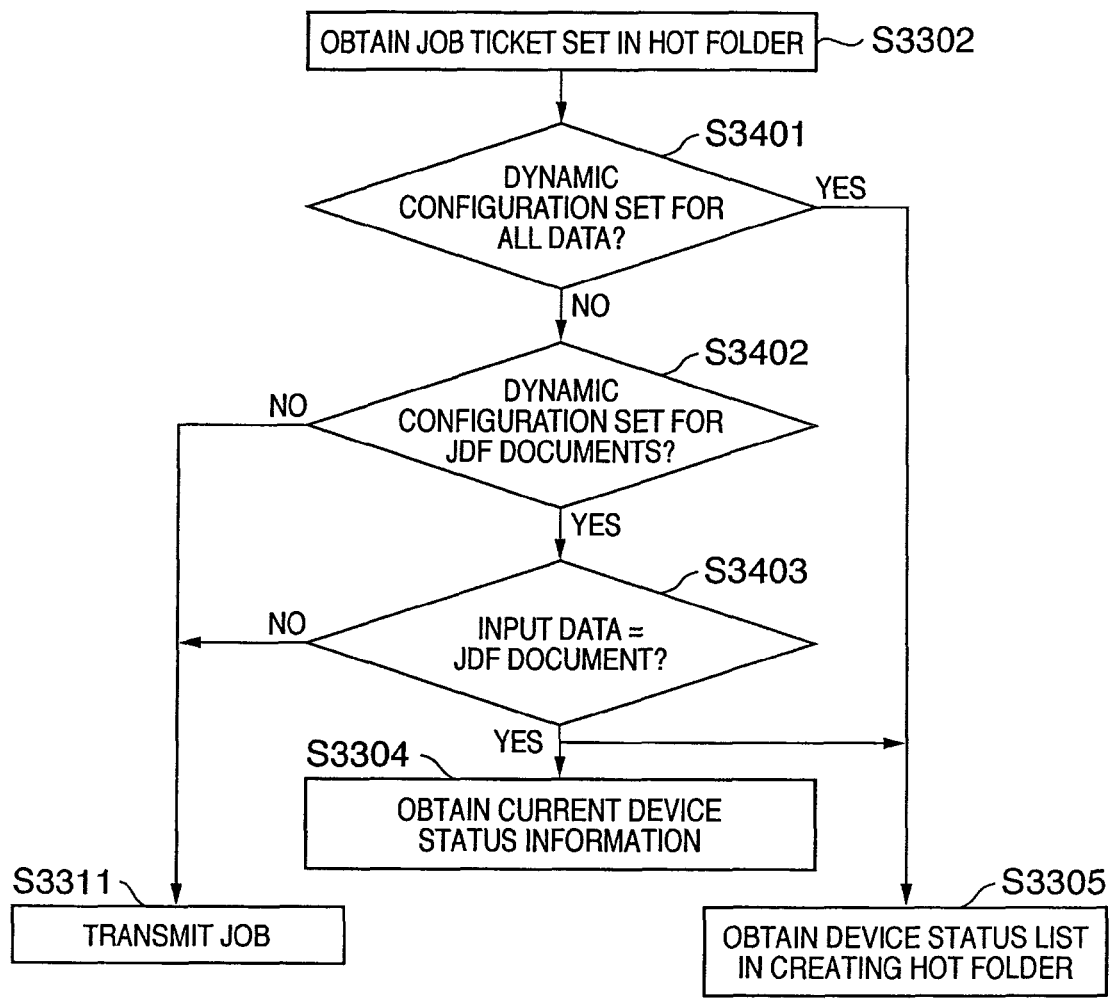

000
INFORMATION PROCESSING APPARATUS FOR SETTING A PRINTING ATTRIBUTE TO A HOT FOLDER

BACKGROUND OF THE INVENTION

1. Field of the Invention

The present invention relates to an information processing technique of processing print data.

2. Description of the Related Art

A printer driver and a hot folder are used for inputting a print job to a printing apparatus. In the use of the hot folder, the user creates a hot folder on the desktop of a host computer or the like. At this time, the user sets desired printing attributes. When the user drags and drops a file to be printed into the folder, the hot folder executes print processing in accordance with the printing attributes set in advance. The hot folder can permanently use printing attributes set once and thus can repeat printing at the same settings (e.g., Japanese Patent Laid-Open No. 2005-115568).

Even the printer driver can perform processing similar to that using the hot folder. For example, the user sets printing attributes on the printer driver, and saves the printing attribute settings as "favorite settings". In printing, the printer driver reads out the printing attributes and can print with the printing attributes set by the user.

Inputting a print job using the printer driver or hot folder allows saving printing attributes set once and repetitively executing jobs at the same settings.

However, the above-mentioned prior art cannot cope with a change of the device status because printing attributes are fixed. Compared to a case of setting printing attributes for a hot folder or the like, the prior art cannot flexibly cope with a change of the paper type prepared in the paper feed cassette, replacement/demounting of a finisher, or a change of resources in the ICC profile or the like.

The present invention has been made to overcome the conventional drawbacks, and has as its object to provide an information processing technique capable of flexibly coping with a change of the device status (addition/change of settings, demounting of a device, or the like), which is impossible by the conventional hot folder technique and driver technique.

SUMMARY OF THE INVENTION

In order to achieve the above object, an information processing apparatus and information processing method according to the present invention mainly have the following arrangements.

According to the present invention, the foregoing object is attained by providing an information processing apparatus which generates print data to be processed by a printing apparatus from input data in accordance with a set printing attribute, comprising:

a first transmission unit which, when storing data in a storage area, transmits the data to the printing apparatus by applying a printing attribute corresponding to the storage area;

a setting unit which sets the printing attribute corresponding to the storage area;

an obtaining unit which obtains status information representing a status of the printing apparatus; and a change unit which changes the printing attribute so as to adapt the printing attribute corresponding to the storage area to the status information obtained by the obtaining unit.

According to another aspect of the present invention, the foregoing object is attained by providing an information processing method of generating print data to be processed by a printing apparatus from input data in accordance with a set printing attribute, comprising:

a first transmission step of, when storing data in a storage area, transmitting the data to the printing apparatus by applying a printing attribute corresponding to the storage area;

a setting step of setting the printing attribute corresponding to the storage area;

an obtaining step of obtaining status information representing a status of the printing apparatus; and a change step of changing the printing attribute so as to adapt the printing attribute corresponding to the storage area to the status information obtained in the obtaining step.

The present invention can dynamically treat a change of the device status and a change of resources, prevent an output result not intended by the user, and achieve information processing for efficient printing.

Further features of the present invention will become apparent from the following description of exemplary embodiments (with reference to the attached drawings).

BRIEF DESCRIPTION OF THE DRAWINGS

FIG. 2 is a view for explaining a print operation using the hot folder;

FIG. 3 is a view for explaining the print operation using the hot folder;

FIG. 9 is a view showing an example of a job ticket for printing attributes;

FIG. 14A is a view showing correspondence between print settings of the hot folder application and device information;

FIG. 14B is a view illustrating status information obtained from a device;

FIG. 15 is a view showing an example of a device status list described in the XML format;

FIG. 26 is a table illustrating the structure of a device status list management table;

FIG. 31 is a table illustrating a device status list management table set in a printer driver in the third embodiment;

FIG. 34 is a flowchart for explaining in detail processing to determine whether dynamic configuration of a hot folder is set in the fourth embodiment.

DESCRIPTION OF THE EMBODIMENTS (Outline of Printing System Using Hot Folder)

Figure 1A:
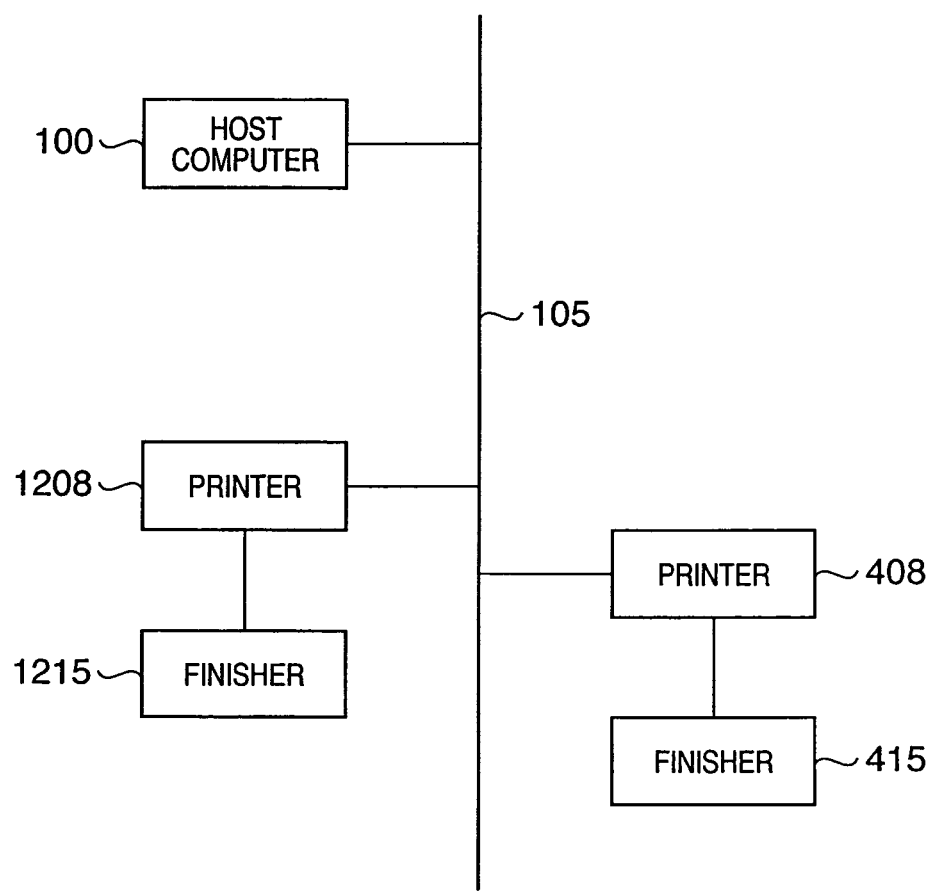
FIG. 1A is a block diagram schematically showing the configuration of a system which prints using a hot folder.

An example of a printing system using a hot folder will be explained. FIG. 1A is a block diagram schematically showing the configuration of a system which prints using a hot folder. Reference numeral 100 denotes an information processing apparatus (host computer); and 408 and 1208, network printers (to be simply referred to as "printers" hereinafter) connectable to a network 113. The printers 408 and 1208 can receive a print job from the host computer 100 and print. The printers 408 and 1208 connect to post-processing apparatuses (finishers) 415 and 1215, respectively. An operating system is installed in the host computer 100, and an application for creating a hot folder is installed on the operating system.

Figure 1B:
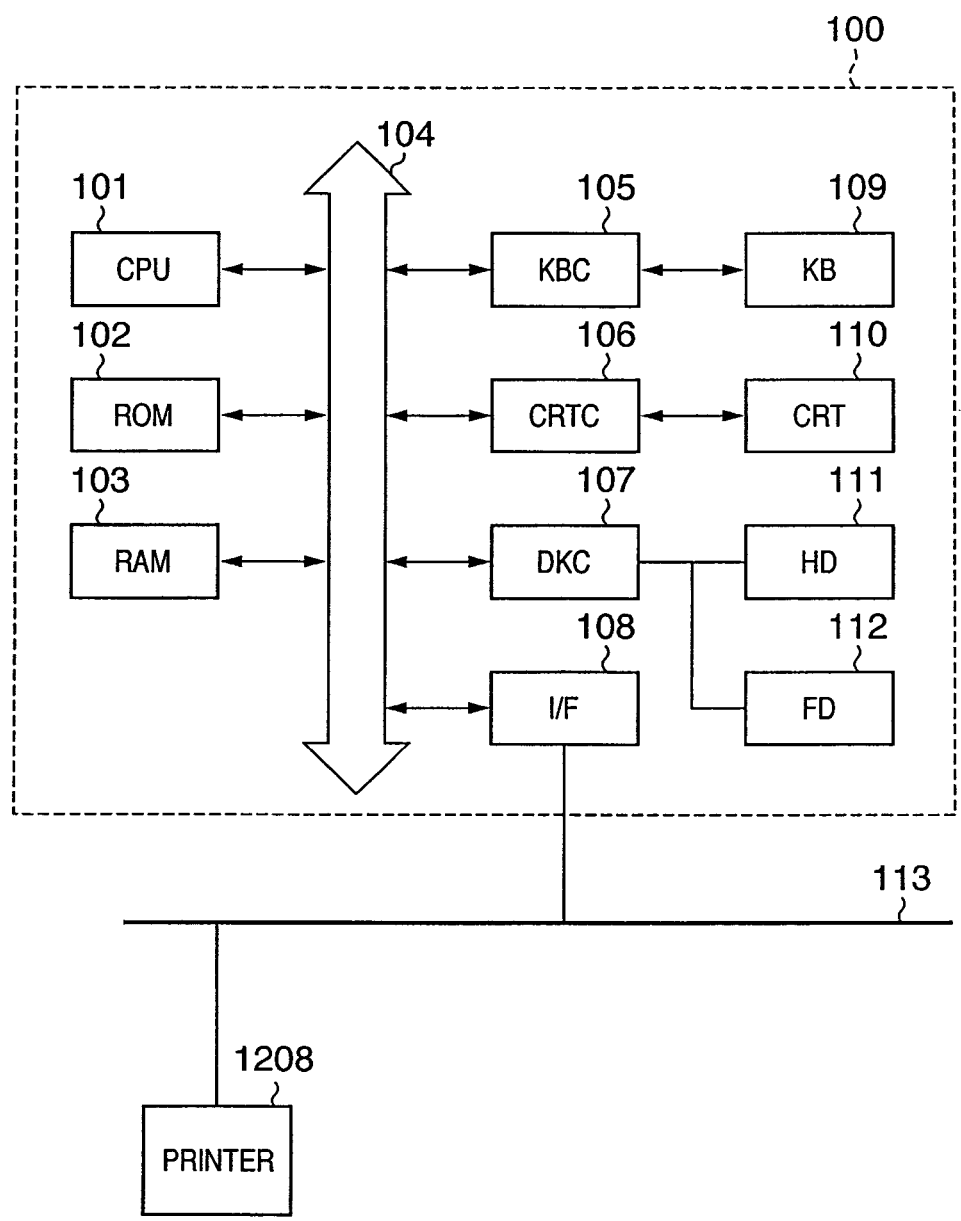
FIG. 1B is a block diagram for explaining the arrangement of an information processing apparatus (host computer)

The information processing apparatus (host computer) having an arrangement as shown in FIG. 1B generates a device status list and executes information processing for a device status list management table and the like, which will be described later. In FIG. 1B, an application runs in the host computer 100. The host computer 100 comprises a CPU 101 which executes an operating system (OS), printer driver, application program, hot folder application, and the like. A ROM 102 or hard disk (HD) 111 stores these programs, or a flexible disk (FD) 112 supplies them.

The CPU 101 comprehensively controls devices connected to a system bus 104. A RAM 103 functions as a main memory, work area, and the like for the CPU 101. A keyboard controller (KBC) 105 controls an instruction input from a keyboard (KB) 109, a pointing device (not shown), or the like. A CRT controller (CRTC) 106 controls display of a CRT display (CRT) 110. A disk controller (DKC) 107 controls access to the hard disk (HD) 111 and flexible disk (FD) 112. These disk media store a boot program, operating system, edit file, user file, application program, network control program, and the like.

A network interface (I/F) 108 bidirectionally exchanges data with a network device and the like via the network 113. As the network, a communication medium such as the LAN or Internet is available. In the following description, the hardware entity which executes processing is the CPU 101, and the software entity is an application program installed in the hard disk (HD) 111, unless otherwise specified.

A print operation using a hot folder will be described with reference to FIGS. 2 and 3.

FIG. 2 is a view showing a desktop window displayed on the display of the host computer 100. Reference numeral 201 denotes a desktop window; 202, a mouse cursor; and 206, a document file to be printed. The format of a file to be printed must be interpretable by the network printers 408 and 1208. This format generally includes PDF (Portable Document Format), PS (PostScript), JPEG, and TIFF files. Reference numerals 203 to 205 denote hot folders. For example, the hot folder 203 has a double-sided printing attribute in advance. The hot folder 204 has a bookbinding printing attribute, and the hot folder 205 has 4-UP printing, 10-copy printing, and double-sided printing attributes.

An operation when the user prints out the document file 206 by bookbinding printing will be explained with reference to FIG. 3.

The user drags the document file 206 to be printed with the mouse, and superposes it on the hot folder 204 having the bookbinding printing attribute. After superposition, the user releases the mouse button to drop the document file 206 in the hot folder 204. At this time, the hot folder application transmits the dropped file to the network printers 408 and 1208 together with printing attribute information. The network printers 408 and 1208 print at preset printing attributes on the basis of the transmitted printing attribute information and document file 206.

(OS and Hot Folder Application)

The operating system (OS) and hot folder application will be described.

Figure 4:
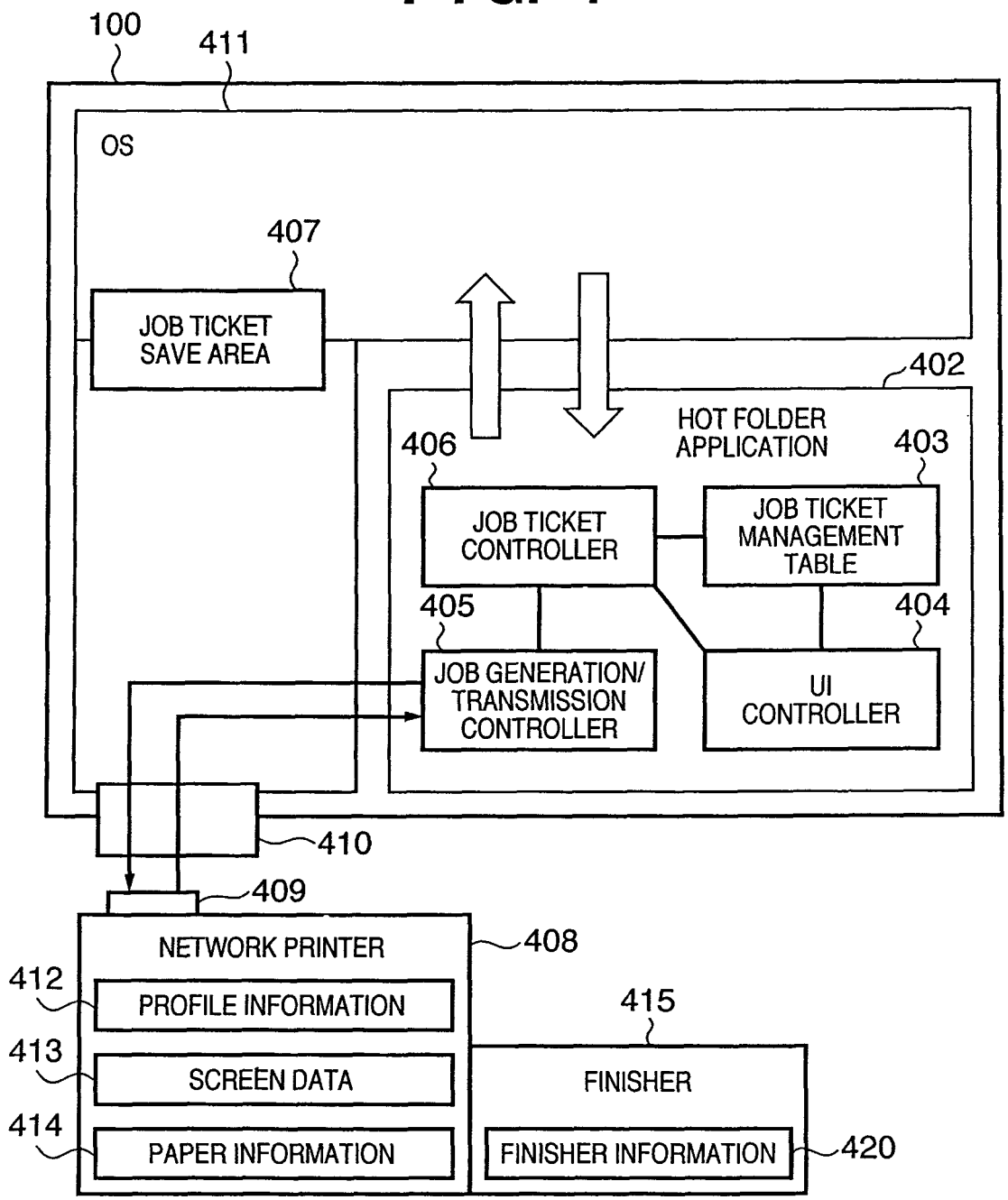
FIG. 4 is a block diagram showing the schematic arrangements of an operating system and hot folder application installed in the host computer.

FIG. 4 is a block diagram showing the schematic arrangements of an operating system 411 and hot folder application 402 installed in the host computer 100. The hot folder application 402 can start or end under the control of the operating system 411, and receive services provided by the operating system 411.

Note that the hot folder is an executable application, but may be a service to be registered in an operating system. The hot folder described below saves printing attributes set by the user as a job ticket of the XML format.

The network printers 408 and 1208 can also interpret a job ticket as a printing attribute. The hot folder application 402 comprises a UI controller 404 which controls settings such as printing attributes, and a job ticket controller 406 which generates and saves a job ticket of printing attributes set by the user through the UI controller 404. The hot folder application 402 comprises a job ticket management table 403 which associates a job ticket, hot folder, and printer with each other. The hot folder application 402 further comprises a job generation/transmission controller 405 which generates a job on the basis of a file dropped in a hot folder and a job ticket associated with the folder and transmits the job to the printer.

A job ticket save area 407 of the operating system saves, via the API (Application Programming Interface) of the operating system, a job ticket generated by the job ticket controller 406.

Reference numeral 410 denotes a network interface of the host computer 100 that connects to a network interface 409 of the printer 408 via a communication medium. For example, the network interface 410 transmits a print job and exchanges information representing a printer status. The printer 408 saves profile information 412 used for color conversion processing, screen data 413 for performing halftone processing, information 414 on paper currently set in the cassette, and the like. The printer 408 connects to the finisher 415, and can perform processing such as stapling in discharge.

(Hot Folder Creation Procedures)

Procedures to create a hot folder by the user will be explained with reference to FIG. 5. Note that the user changes the page layout setting to "4UP", the single/double-sided setting to "double-sided", and the copy count setting to "10 copies" from default settings of printing attributes, thereby setting printing attributes.

In step S501, the user creates a folder at an arbitrary location, and gives an easy-to-understand name to the folder. In general, a hot folder conveniently exists on the desktop of a host computer and is created on it. To recognize printing attributes changed from defaults, the folder is given a folder name "4UP_10copies_double-sided printing". Needless to say, the name is arbitrary. By this procedure, a folder "4UP_10copies_double-sided printing" is generated on the desktop, like the hot folder 205 shown in FIG. 2.

In step S502, the hot folder application 402 starts up to open a hot folder setting dialog.

Figure 6:
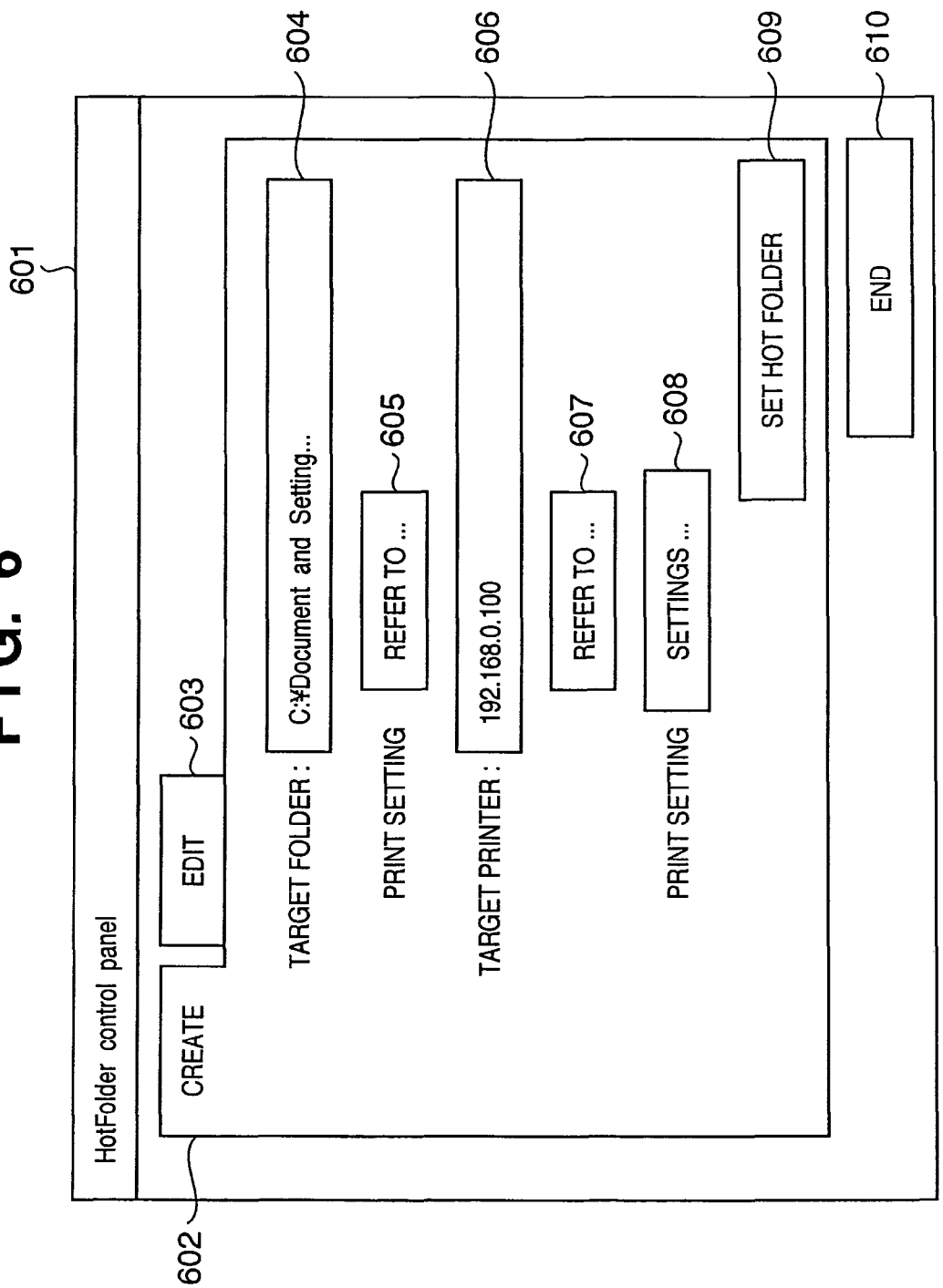
FIG. 6 is a view showing an example of a dialog displayed when the hot folder application starts up.

FIG. 6 is a view showing an example of a dialog displayed when the hot folder application starts up. Reference numeral 601 denotes a hot folder application dialog; 602, a sheet for creating a hot folder; and 603, a sheet for editing a created hot folder. In FIG. 6, an input field 604 designates the folder path of a target folder to be set as a hot folder. A button 605 is used to open a reference dialog in order to designate a folder path in the reference dialog, instead of directly inputting a folder path to the input field 604 for designating a target folder path. An input field 606 designates a target printer for selecting a printer as a printout target.

A button 607 is used to open a reference dialog in order to designate a printer in the reference dialog, instead of directly inputting a printer (to be referred to as a "target printer" hereinafter) designated as the output destination of a file (data) dropped in a hot folder. Note that a target printer is designated by its IP address (192.168.0.100), but the designation method is arbitrary as far as a printer can be specified.

Reference numeral 608 denotes a setting button for opening a dialog to set the printing attributes of a hot folder; and 609, a hot folder setting button for setting the printing attributes of a target hot folder and its target printer in the current status.

Reference numeral 610 denotes a button for ending the hot folder application.

Referring back to FIG. 5, the created folder is designated as a target folder in step S503. Since the folder having the folder name "4UP_10copies_double-sided printing" is created on the desktop in step S501, the user inputs, to the input field 604 used for the target folder designation control, a path to the desktop for designating the folder. Note that a folder path precedent to the folder name depends on the operating system.

In step S504, the user sets the printing attributes of the target hot folder. The user presses the printing attribute setting button 608 (FIG. 6) in order to set the printing attributes. When the user presses the button, printing attribute setting dialogs shown in FIGS. 7 and 8 appear.

(Description of Printing Attribute Setting Dialog)

Figure 7:
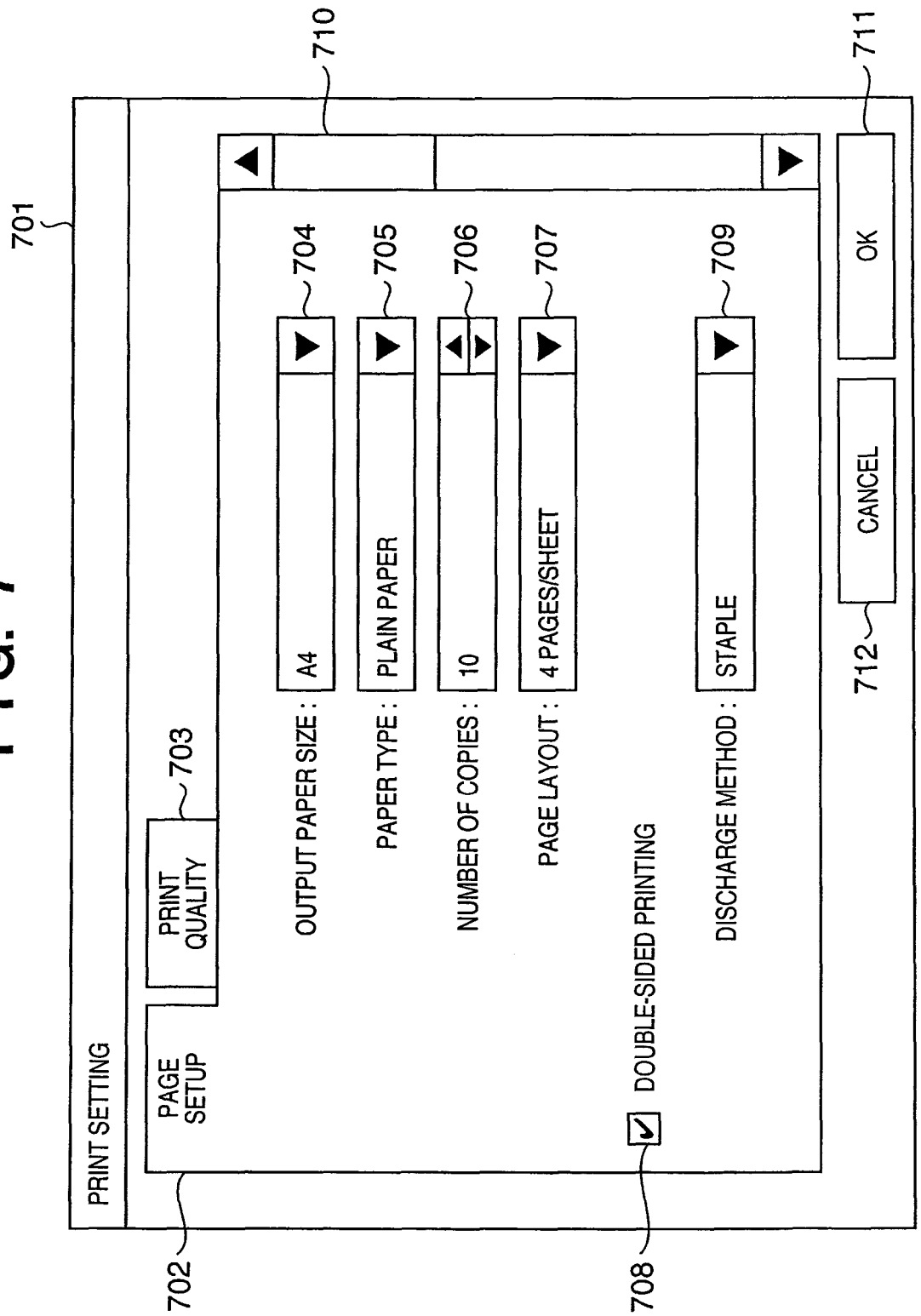
FIG. 7 is a view showing a dialog for setting the printing attributes of the hot folder.

FIG. 7 shows a dialog for setting the printing attributes of a hot folder. Reference numeral 701 denotes a printing attribute setting dialog; 702, a tab for displaying various settings associated with page settings; 703, a tab for displaying various settings associated with the print quality. Reference numerals 704 to 709 enable various settings (paper size, paper type, number of copies, page layout, whether to perform double-sided printing, and discharge method) on page settings.

FIG. 7 shows the beginnings of settable printing attributes, and settings other than printing attributes shown in FIG. 7 can be displayed with a scroll control 710.

Printing attributes except for ones shown in FIG. 7 will be omitted. In this case, the default settings of printing attributes are the output paper size "A4", the paper type "plain paper", the number of copies "10 copies", the page layout "4 pages/sheet", double-sided printing, and the discharge method "staple".

The user presses an OK button 711 to finalize set printing attributes. To discard contents and return to the hot folder dialog in FIG. 6, the user presses a cancel button 712.

The user may refer to the paper information 414 saved in the printer 408 when displaying the pull-down menus of the output paper size 704 and paper type 705. Similarly, when setting the discharge method 709, information representing whether the finisher 415 is connected may be obtained from the printer 408 to change the pull-down menu of the discharge method 709 in accordance with the information.

Figure 8:
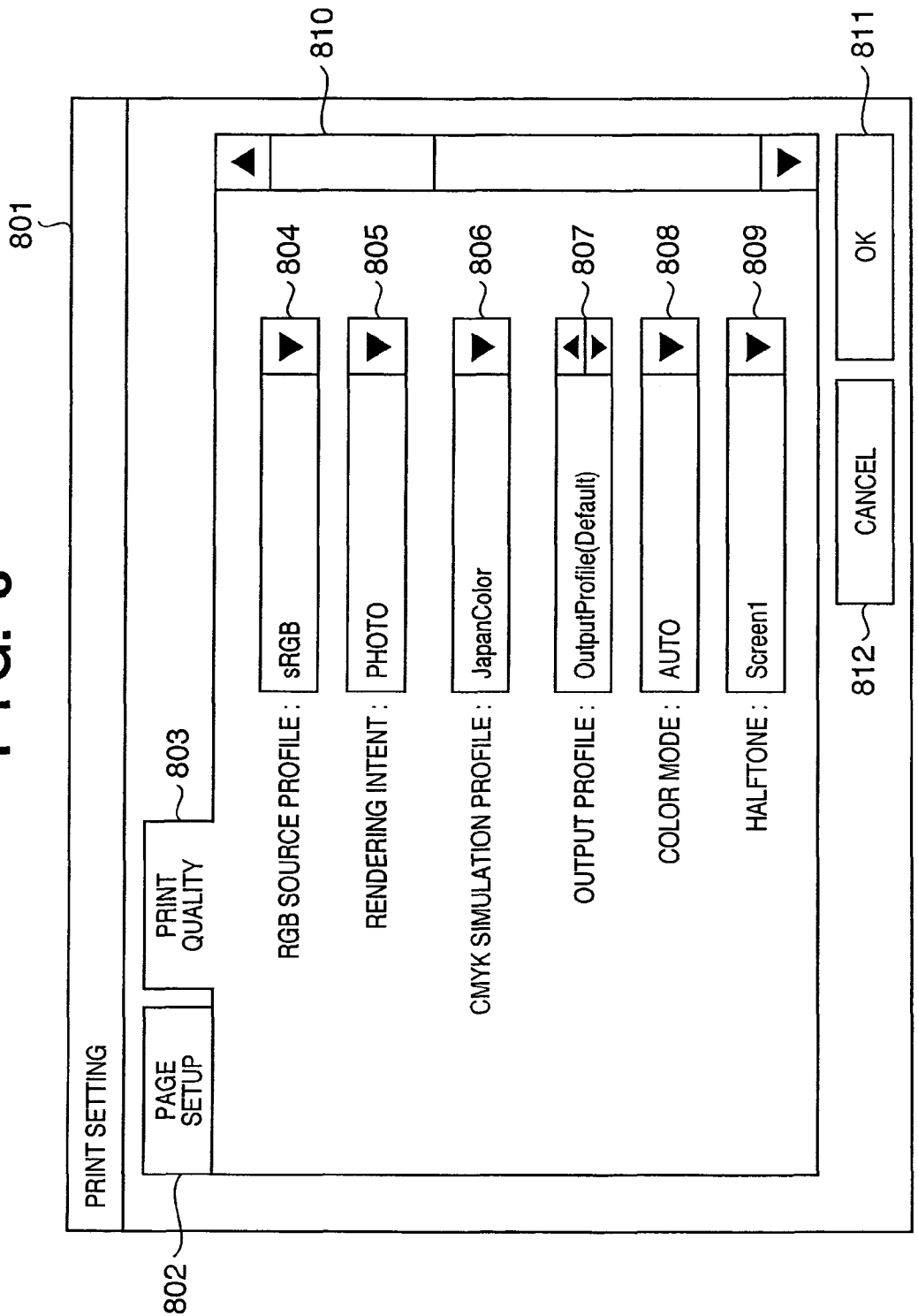
FIG. 8 is a view showing an example of a print quality setup window.

When the user clicks the print quality tab 703, a UI as shown in FIG. 8 appears. Reference numerals 801 to 803 denote the same parts as those of reference numerals 701 to 703 in FIG. 7. In FIG. 8, the print quality tab 803 is selected. Reference numerals 804 to 809 allow various settings associated with the print quality. Reference numeral 810 denotes a scroll control identical to the scroll control 710 in FIG. 7.

The user finalizes settings on the UI window with an OK button 811. When the user presses a cancel button 812, the UI returns to the hot folder dialog (FIG. 6).

The setting items of the setting fields 804 to 807 in the UI window are associated with color conversion, and actual print work uses the profile information 412 in the printer 408. The color mode setting 808 is relevant to the screen data 413 of the printer 408, which is used in printing. In setting from the setting fields 804 to 807 and 809, their pull-down menu may be changed by referring to the profile information 412 and screen data 413.

Figure 5:
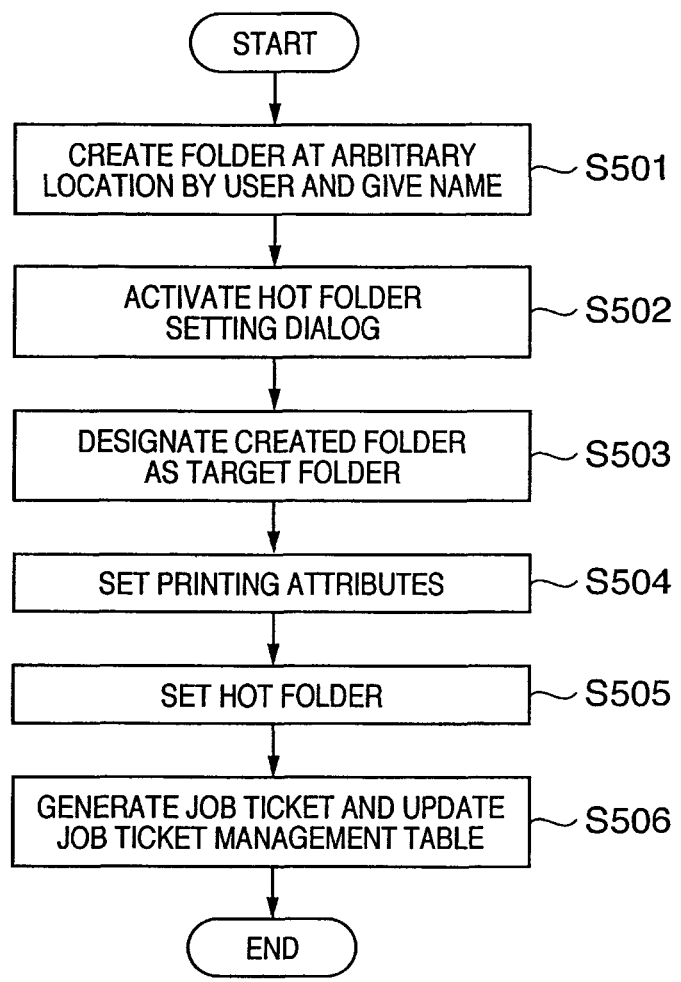
FIG. 5 is a flowchart showing procedures to create a hot folder by the user.

The user presses the hot folder setting button 609 in the hot folder dialog of FIG. 6 to generate a job ticket in the target folder in step S506 of FIG. 5. Then, the job ticket management table is updated together with the target printer information.

(Generation of Job Ticket and Job Ticket Management Table)

Generation of a job ticket in step S506 and a job ticket management table will be described.

FIG. 9 is a view showing an example of a job ticket for printing attributes set in step S505 of FIG. 5. The job ticket described below has the XML format, but may take another description format as far as printing attributes can be recorded and identified. In the job ticket, a paper size 901 is A4, and a media type 902 is "Plain" representing plain paper. A number of copies 903 is 10 copies, a page layout 904 is 4 pages/sheet, a plex type 905 is duplex, and an output type 906 is "staple".

FIG. 9 shows a job ticket corresponding to printing attributes set in FIG. 7. The same method can also describe other printing attributes such as the output profile and color mode shown in FIG. 8. The job ticket save area 407 managed by the operating system saves a job ticket generated in the above way via the API of the operating system 411.

(Job Ticket Management Table)

Figure 10:
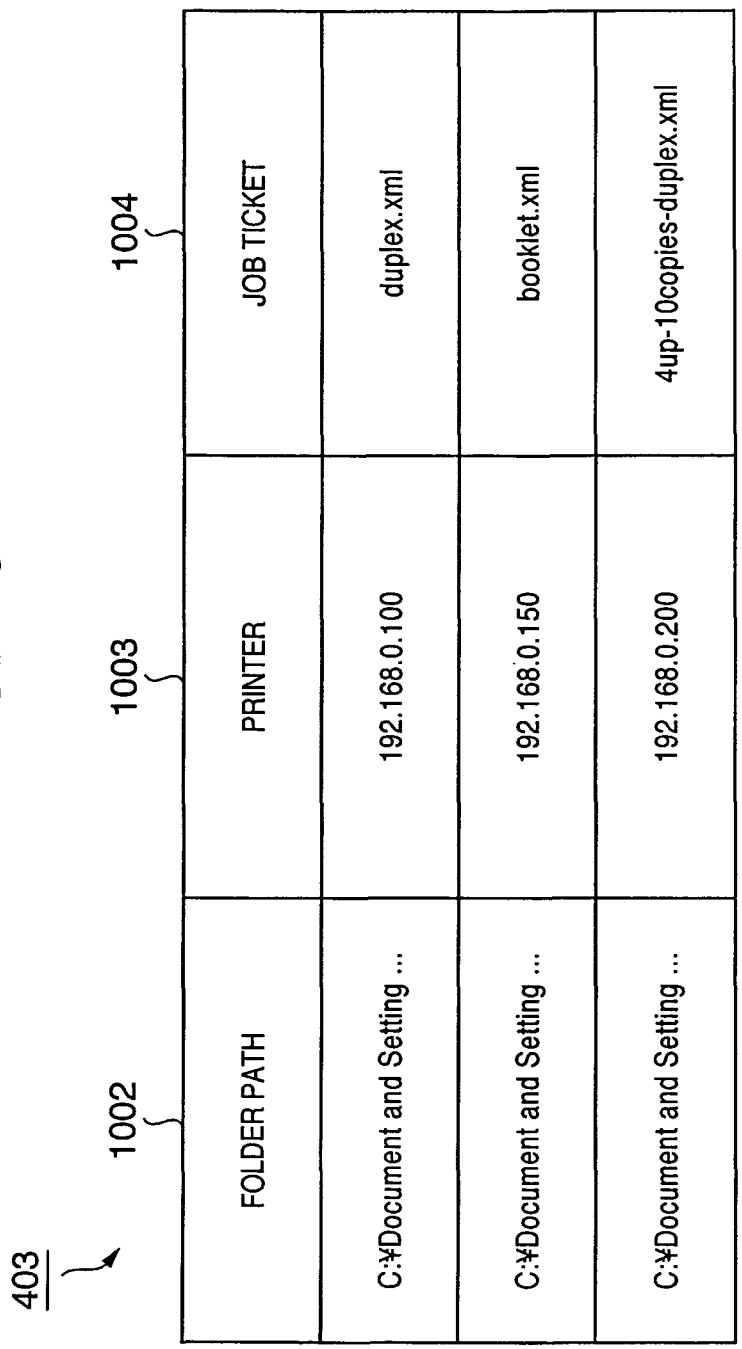
FIG. 10 is a table showing a job ticket management table.

FIG. 10 is a table showing the job ticket management table 403. The hot folder application 402 generates and holds a job ticket management table which makes the name of a generated job ticket, the folder path of a target hot folder, and a target printer correspond to each other. In FIG. 10, the job ticket management table 403 stores a folder path 1002 of a target hot folder, a target printer 1003, and a job ticket name 1004.

The job ticket management table 403 describes a full path as the folder path of a target hot folder, a designated IP address as a target printer, and only a file name as a job ticket because the directory which stores a job ticket is defined in advance. When the user drops a file into a given folder, the hot folder application 402 can use the folder name as a key to know a target printer and corresponding job ticket from the management table.

(Hot Folder Processing)

Hot folder processing will be explained.

Figure 11:
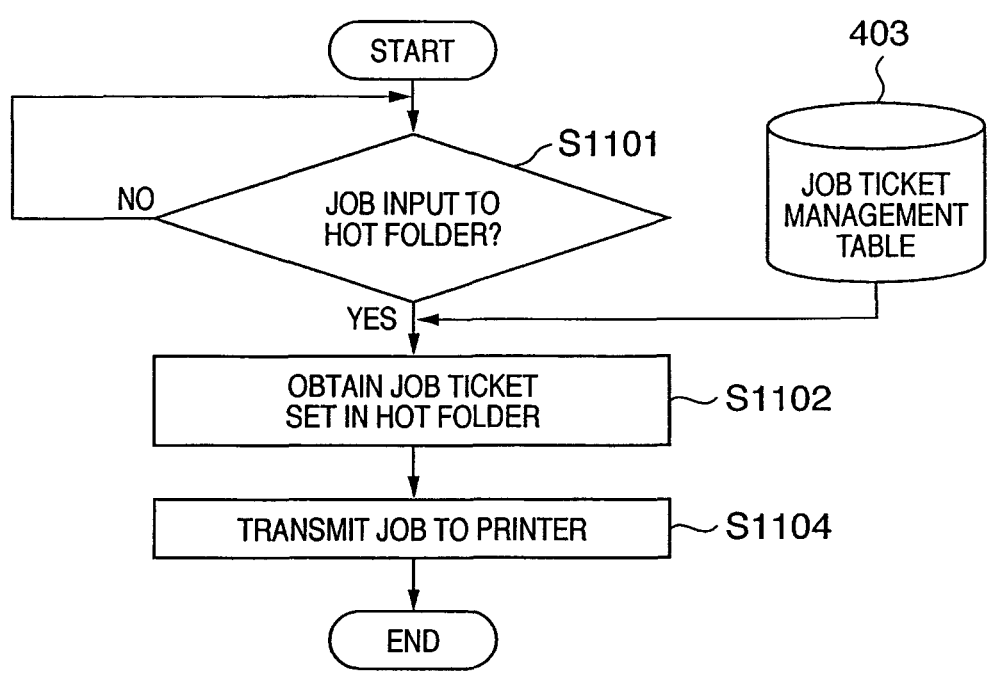
FIG. 11 is a flowchart showing hot folder processing procedures when dropping a file into a hot folder.

FIG. 11 is a flowchart showing hot folder processing procedures when the user drops a file into a hot folder.

In step S1101, the hot folder application 402 monitors drop of a file into a hot folder by the user. If the user does not drop any file, the process returns to step S1101 to repeat monitoring. If the user drops a file, the process advances to step S1102 to search the job ticket management table 403 for a job ticket set for the hot folder and obtain the job ticket. At this time, the hot folder application 402 also obtains target printer information. In step S1104, the hot folder application 402 transmits the job to the printer, and the process ends. The user can drop arbitrary application data into a hot folder as far as the hot folder application can interpret the data. Unlike processing by the driver, no print event need be activated via an application corresponding to a file format.

(First Embodiment)

The first embodiment of the present invention will be described with reference to the accompanying drawings. The configuration of a system having an information processing apparatus and printer, and the display and operation of a hot folder are the same as those in FIGS. 1A to 3.

Figure 12:
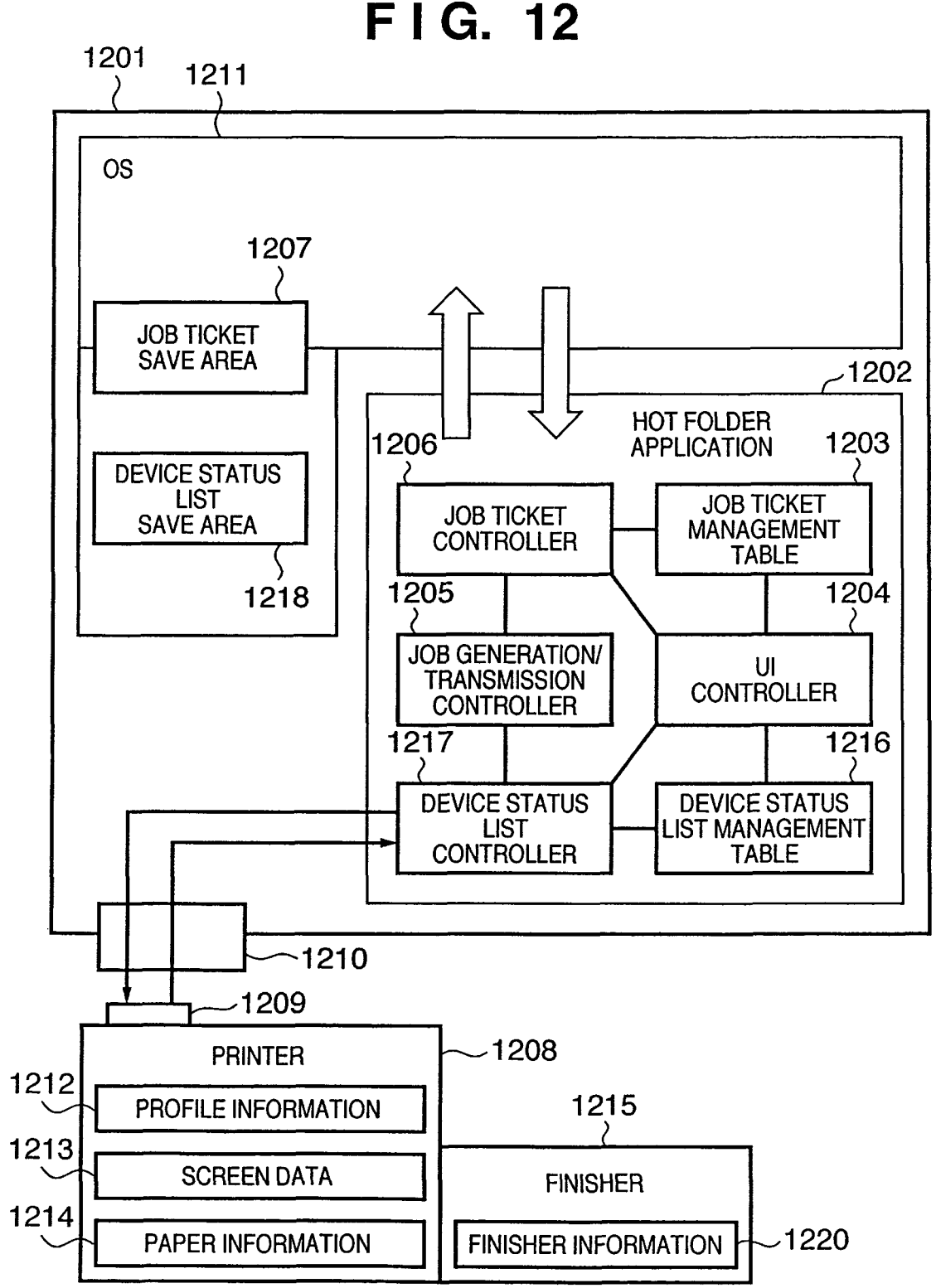
FIG. 12 is a block diagram showing the arrangement of a hot folder application executed by the information processing apparatus according to the first embodiment.

FIG. 12 shows the arrangement of a hot folder application executed by the information processing apparatus (host computer) according to the first embodiment. In FIG. 12, a host computer 1201 comprises an OS 1211 and hot folder application 1202. The OS 1211 includes a job ticket save area 1207 and device status list save area 1218.

The hot folder application comprises a job ticket management table 1203, UI controller 1204, job ticket controller 1206, job generation/transmission controller 1205, device status list management table 1216, and device status list controller 1217.

The host computer 1201 can communicate with a printer 1208, and the printer 1208 connects to a finisher (post-processing apparatus) 1215. The host computer 1201 to finisher 1215 can perform the same processes as those of the host computer 100 and the hot folder application 402 to finisher 415 in FIG. 4.

As an arrangement different from FIG. 4, the device status list management table 1216, device status list controller 1217, and device status list save area 1218 are added in FIG. 12. In setting by the UI controller 1204, the device status list controller 1217 generates a device status list, and the device status list management table 1216 manages the device status list by making the folder path of a hot folder and a designated target printer correspond to each other. The device status list controller 1217 saves the device status list in the device status list save area 1218 of the OS 1211 via the API of the OS 1211.

The host computer 1201 which generates print data to be processed by the printer 1208 from input data in accordance with set printing attributes (job ticket) comprises the following arrangement. The host computer 1201 comprises a transmission unit which, when storing data in a predetermined storage area, transmits data to the printer 1208 by applying printing attributes corresponding to the predetermined storage area.

The host computer 1201 comprises a setting unit which sets printing attributes corresponding to a predetermined storage area, and an obtaining unit which obtains status information (information containing at least one of pieces of information on addition/change of settings in the printer and demounting of a device) representing the status of the printer 1208.

The host computer 1201 comprises a change unit which changes printing attributes so as to adapt printing attributes corresponding to a predetermined storage area to status information obtained by the obtaining unit.

Under the control of a CPU 101, the respective controllers of the hot folder application 1202 can execute the processes of the transmission unit, setting unit, obtaining unit, and change unit which form the host computer 1201.

(Creation of Hot Folder)

Figure 13:
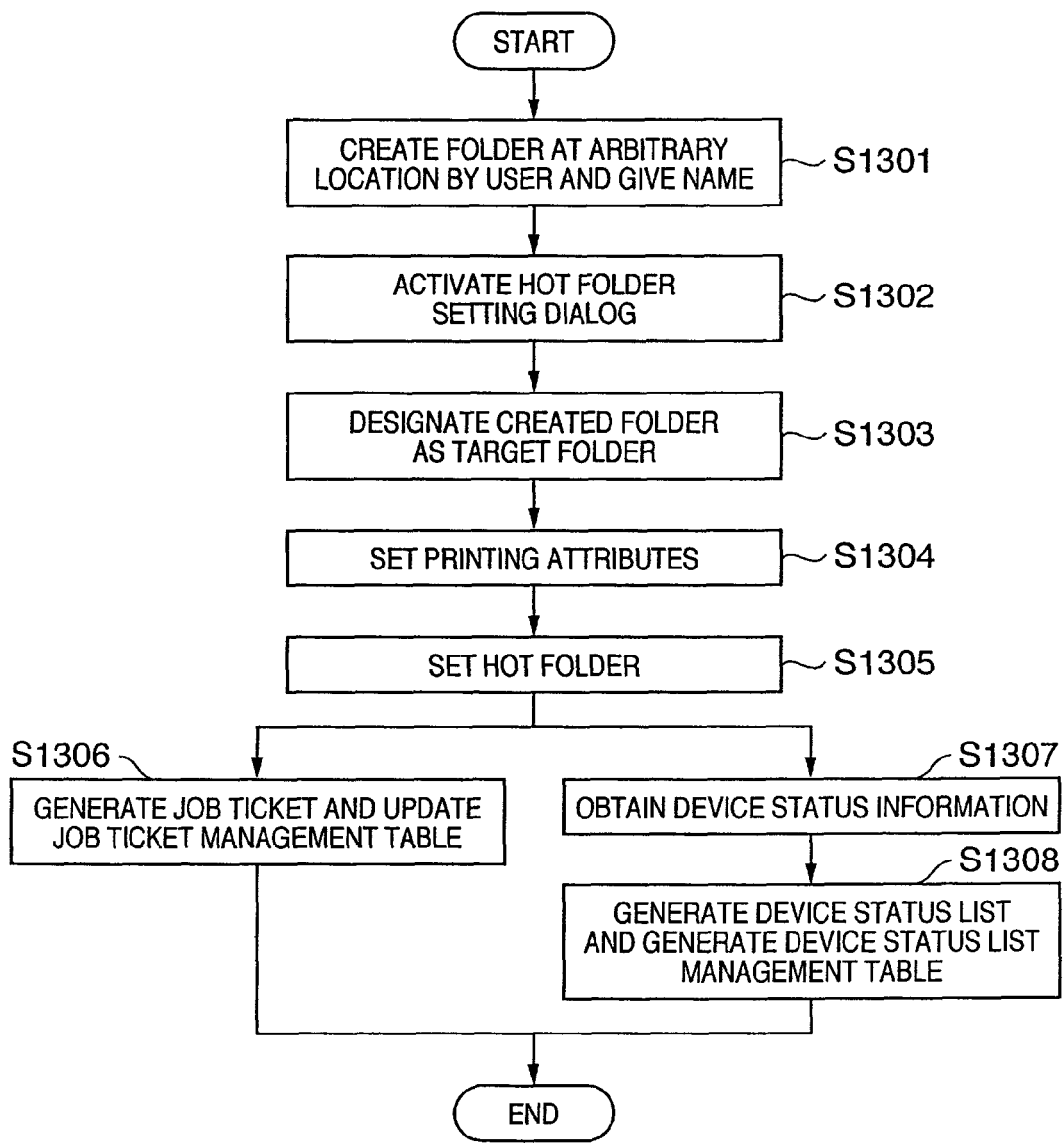
FIG. 13 is a flowchart for explaining procedures to create a hot folder in the first embodiment of the present invention.

Procedures to create a hot folder in the first embodiment of the present invention will be explained with reference to FIG. 13. Steps S1301 to S1306 are the same as the above-described steps S501 to S506 in FIG. 5, and a description thereof will be omitted.

After a hot folder is set in step S1305, the process advances to step S1307 in parallel with step S1306. The hot folder application 1202 obtains status information of a device (printer 1208 in FIG. 12) which connects to the host computer. The obtained device status information is relevant to all printing attributes settable by the user via the hot folder application 1202. Hence, the device information contains not only profile information 1212 and screen data 1213 held in the device (printer 1208) but also finisher information 1220 on the finisher 1215 connected to the device (printer) 1208. When the information processing apparatus holds profile information, the device information also contains this information.

In step S1308, the hot folder application 1202 generates a device status list and device status list management table.

The user designates the folder path of a target folder, a target printer, print settings, and the like in a dialog displayed when the hot folder application starts up (FIGS. 6 to 8). A job ticket generated by setting printing attributes has the same structure as that in FIG. 9. Similar to FIG. 10, the job ticket management table 1203 manages the job ticket, the folder path of the designated target folder, and the target printer.

(Device Status List)

A device status list based on device status information obtained in step S1307 of FIG. 13 will be explained. Print settings of the hot folder application in FIGS. 7 and 8 will be exemplified. Device information is relevant to an output paper size 704, paper type 705, and discharge method 709 on a "page setup" tab 702 and "print quality" tab 703 in FIG. 7. Device information is relevant to an RGB source profile 804, CMYK simulation profile 806, output profile 807, and halftone 809 on a "page setup" tab 802 and "print quality" tab 803 in FIG. 8.

FIG. 14A is a view showing correspondence between print settings of the hot folder application and device information. The output paper size 704 and paper type 705 correspond to paper information 1214 in FIG. 12. The RGB source profile 804, CMYK simulation profile 806, and output profile 807 correspond to the profile information 1212. The halftone corresponds to the screen data 1213, and the discharge method corresponds to the finisher information 1220.

FIG. 14B illustrates status information obtained from a device. In FIG. 14B, the RGB source profile of profile information contains "SRGB" and "gamma 1.8 Monitor". The CMYK simulation profile of the profile information contains "JapanColor" and "SWOP". The output profile contains "OutputProfile(Default)".

The halftone (Halftones) represents that the device (printer) 1208 adopts "Screen1", "Screen2", and "ErrorDiffusion".

The discharge method setting represents that the printer has two cassettes: cassette 1 storing A4 plain paper (A4 normal), and cassette 2 storing A3 glossy paper (A3 photo paper). A finisher (post-processing apparatus) connected to the device (printer) has a name "Finisher-A".

FIG. 15 shows the status in FIG. 14B by a device status list. The device status list is described in the XML format, similar to a job ticket (e.g., FIG. 9), but is not limited to this format. For example, the device status list can be described by a structured document such as HTML or SGML.

In the first embodiment, the device status list describes device information of the printer 1208 and connected finisher 1215 together. Alternatively, the device status list may describe the printer 1208 and finisher 1215 discriminately as independent devices.

(Device Status List Management Table)

The device status list controller 1217 generates the device status list management table 1216 which makes a generated device status list, the folder path of a target hot folder, and a target printer correspond to each other. The hot folder application 1202 holds the device status list management table. FIG. 26 is a table illustrating the structure of a device status list management table 2601. The device status list management table 2601 makes a folder path 2602 of a target hot folder, address information 2603 (e.g., IP address) for specifying a target printer as an output destination, and a device status list 2604 correspond to each other.

In FIG. 26, the device status list management table 2601 describes a full path as the folder path of a target hot folder, a designated IP address as a target printer, and only a file name as a device status list because the directory which stores a device status list is defined in advance.

When the user drops a file into a given folder, the hot folder application 1202 can use the folder name as a key to know a target printer and corresponding device status list from the device status list management table.

(Hot Folder Processing)

Hot folder processing procedures according to the first embodiment of the present invention will be explained with reference to the flowchart of FIG. 16. The job ticket controller 1206, device status list controller 1217, and UI controller 1204 execute this flowchart under comprehensive control of the hot folder application 1202.

In step S1601, the hot folder application 1202 determines whether the user inputs a file (data) into a hot folder.

If the user does not input any file (data) in step S1601 (NO in S1601), the process waits for input of a file (data).

If the user inputs a file (data) (YES in S1601), the process advances to step S1602 to search the job ticket management table 1203 (see FIG. 10) and obtain a job ticket set for a corresponding hot folder. For example, when a hot folder is designated as represented by the job ticket management table in FIG. 10, a corresponding job ticket can be specified.

In step S1604, the hot folder application 1202 obtains status information set for the current device, as described with reference to FIGS. 14A, 14B, and 15.

In step S1605, the hot folder application 1202 searches the device status list management table 1216 to obtain the device status list of a corresponding hot folder. When the device status list management table is not updated, the obtained device status list is one in creating a hot folder. When the device status list management table is updated, the latest updated device status list is obtained.

In step S1607, the device status list controller 1217 compares the current device status information (S1604) with the device status list of the corresponding hot folder (S1605).

If the device status list obtained in step S1605 matches the current device status information in step S1608, the hot folder application 1202 determines that the device status has not changed. If the device status has not changed (NO in S1608), the process advances to step S1611 to transmit the file (data) input to the hot folder to the designated-target printer (1208 in FIG. 12).

If the hot folder application 1202 determines in step S1608 that the device status list obtained in step S1605 does not match the current device status information, it determines that the device status has changed.

If the device status has changed (YES in S1608), the process advances to step S1609, and the hot folder application 1202 displays, on a CRT 110, a user interface (UI) which prompts the user to change printing attributes.

If the user does not change the printing attributes from the UI (NO in S1609), the process advances to step S1611 to transmit the job without changing the printing attributes (S1611).

If the user changes the printing attributes from the UI in step S1609, the process advances to steps S1610 and S1612.

In step S1610, the job ticket controller 1206 creates a job ticket again on the basis of information on the printing attributes changed by the user. In step S1611, the hot folder application 1202 transmits the job to the designated target printer.

In step S1610, the job ticket controller 1206 saves the re-created job ticket in the job ticket management table 1203 to update the job ticket management table 1203 (S1670). In the next job input, the job ticket management table 1203 provides the updated job ticket.

In step S1612, the device status list controller 1217 creates a device status list again on the basis of information on the printing attributes changed by the user to update information in the device status list management table 1216 (S1680). The updated device status list management table 1216 is based on the printing attributes changed in step S1609, and corresponds to the re-created job ticket.

For example, when the user subsequently inputs a file (data) into the hot folder, the current device status information and device status list information match each other. The hot folder application 1202 can successively transmit jobs to a printer designated as a target printer.

(UI Display)

Figure 18:
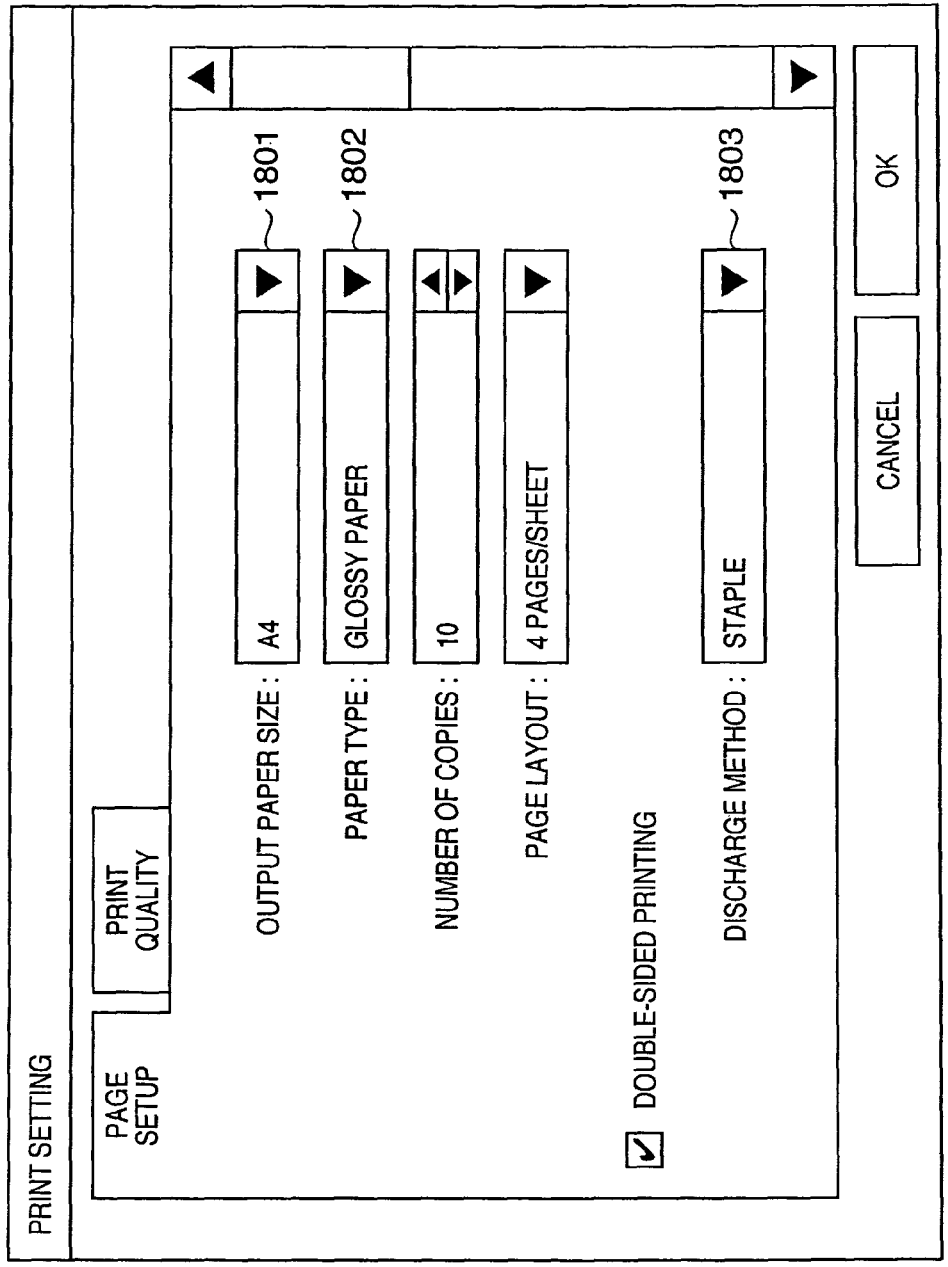
FIG. 18 is a view illustrating page settings when creating a hot folder.
Figure 19:
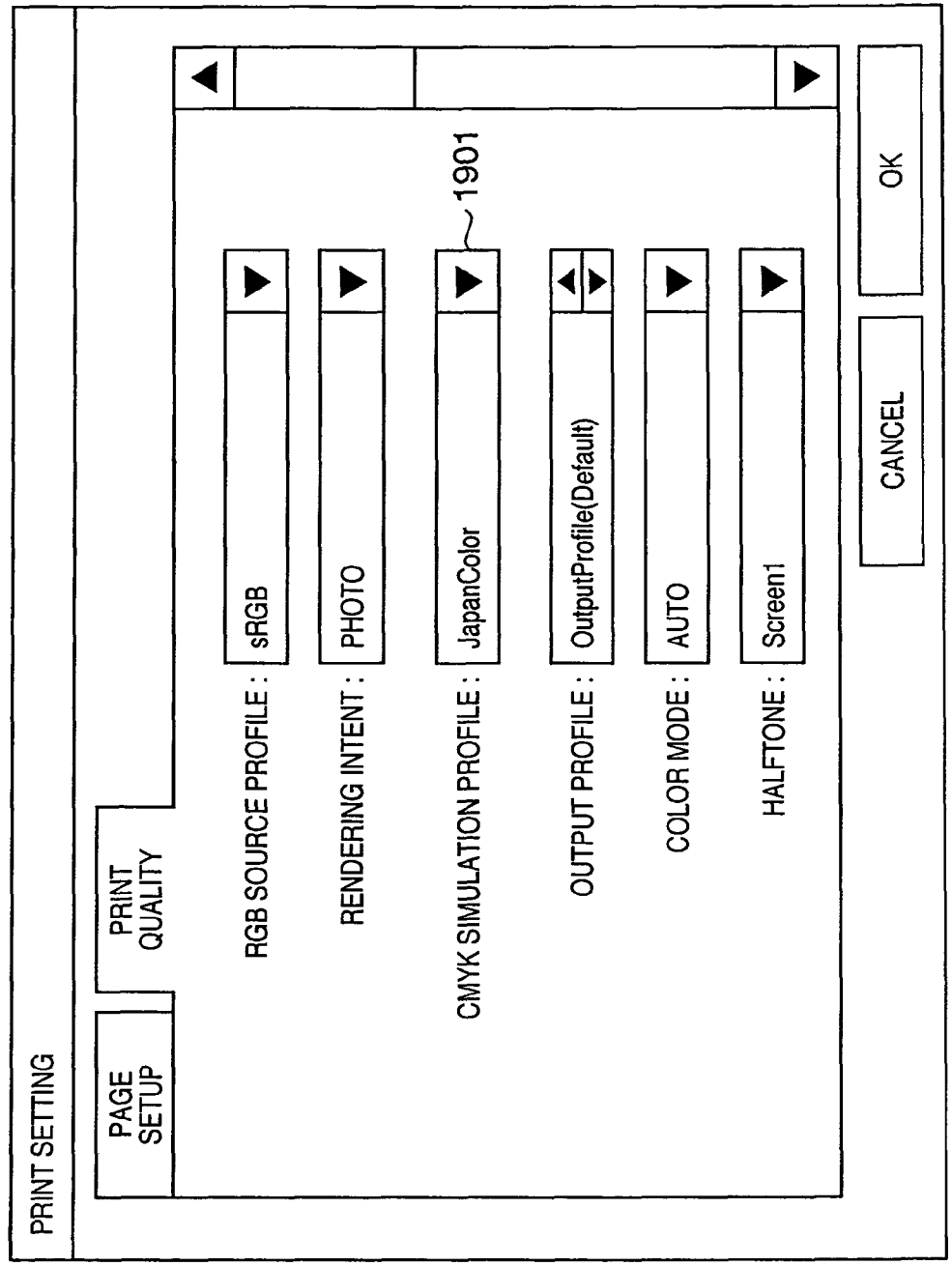
FIG. 19 is a view illustrating the print quality when creating a hot folder.

Display of the UI which prompts the user to change printing attributes in step S1609 will be described. FIG. 18 shows a UI for inputting page settings when creating a hot folder. FIG. 19 shows a UI for setting the print quality when creating a hot folder. Printing attributes are set on the basis of information input to these UIs. In an initial state, device information shown in FIG. 14B is set as information representing a device status in creating a hot folder. After that, the device status changes into one as shown in FIG. 17.

Figure 17:
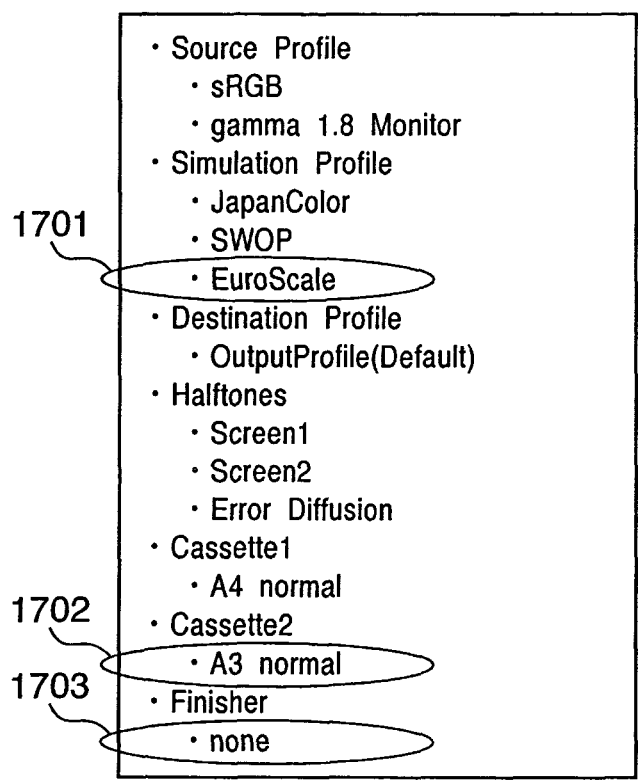
FIG. 17 is a view illustrating a device status in inputting a job.

The device status list controller 1217 compares items between FIGS. 14B and 17 and determines whether items of the device status have changed. Changed items between FIGS. 14B and 17 are three denoted by reference numerals 1701 to 1703. More specifically, compared to items in creating a hot folder (FIG. 14B), the simulation profile additionally contains "EuroScale" 1701. Cassette 2 changes from A3 glossy paper to A3 plain paper (A3 normal) 1702. Since the finisher 1215 is demounted, the finisher changes to "none" (deleted) 1703.

In FIG. 18, an output paper size 1801 is set to "A3", and a paper type 1802 is set to "glossy paper". A discharge method 1803 designates "staple". In FIG. 19, a simulation profile 1901 is "JapanColor".

The UI controller 1204 performs display control to display, on the CRT 110, a UI for setting the output paper size 1801, paper type 1802, discharge method 1803, and simulation profile in accordance with the determination result by the device status list controller 1217.

Figure 20:
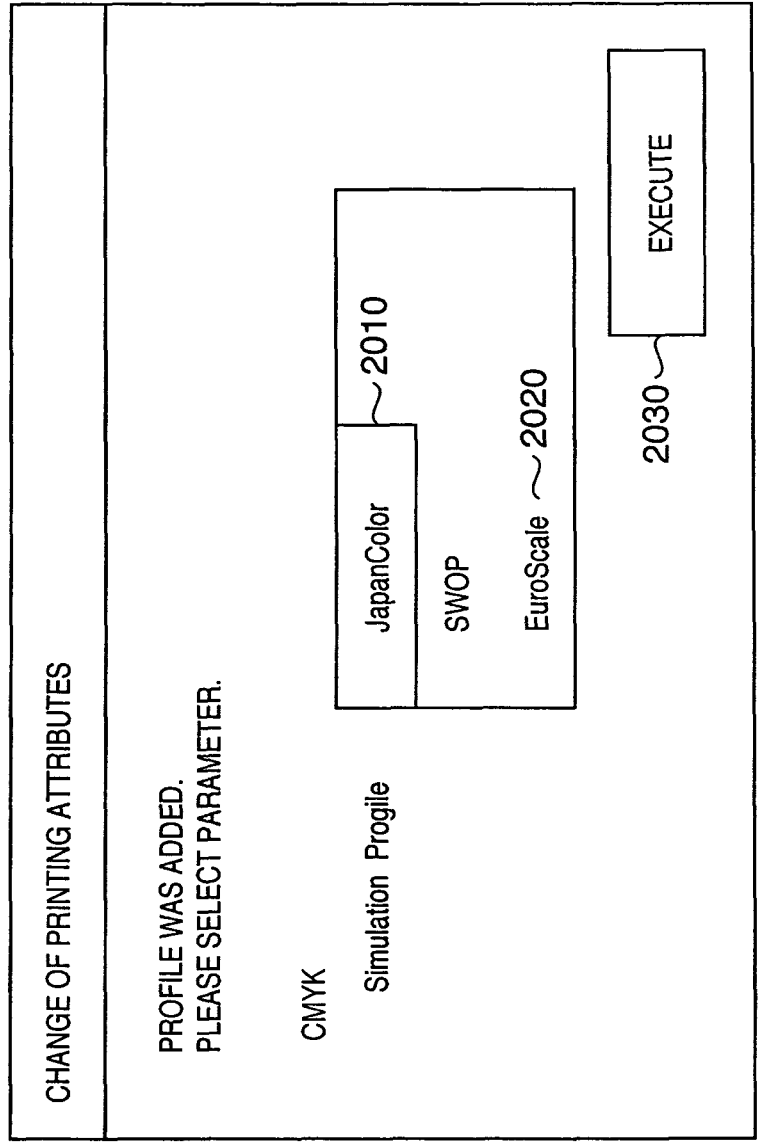
FIG. 20 is a view showing a UI for adding a simulation profile.

FIG. 20 shows a UI for adding a simulation profile. "EuroScale" 2020 is added as an additional simulation profile to an initial status setting (JapanColor) 2010. When the user selects "EuroScale" as an added simulation profile from the UI and presses an execution button 2030, the device status list controller 1217 reflects the added device status to update the device status list.

Figure 21:
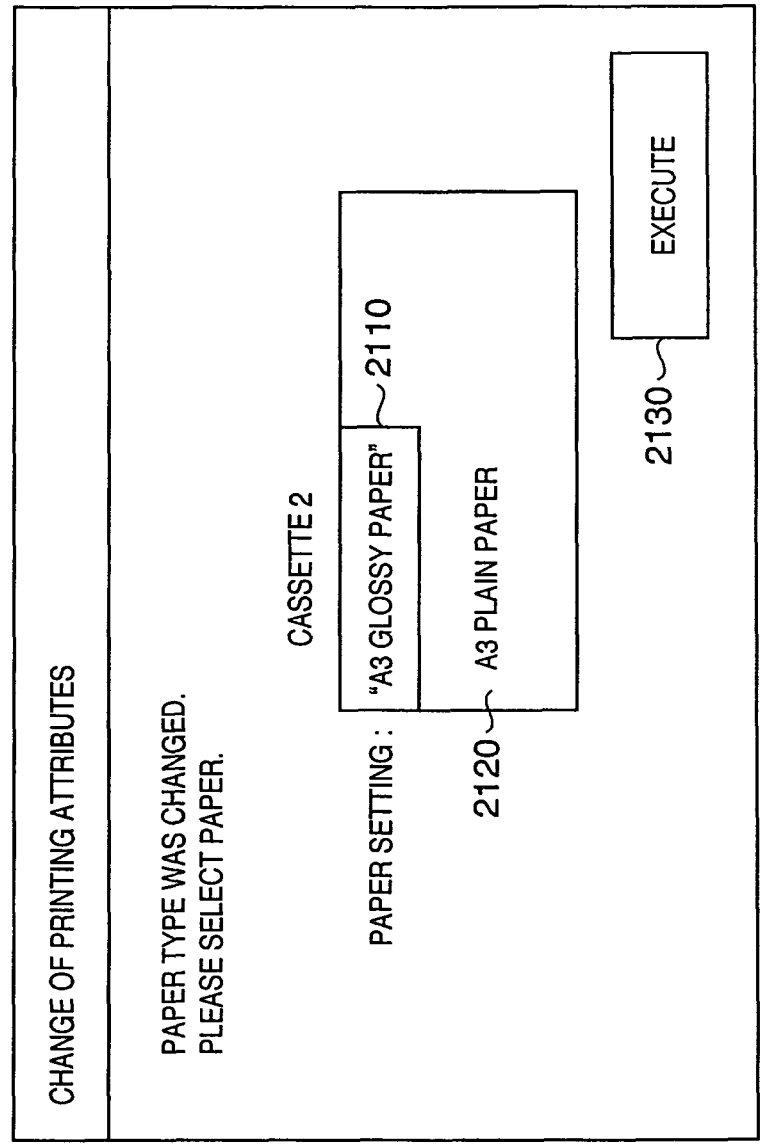
FIG. 21 is a view showing a UI for changing the paper type.

FIG. 21 shows a UI for changing the paper type. "A3 plain paper" 2120 is added as a changed paper type to an initial status setting (A3 glossy paper). When the user selects the changed paper type from the UI and presses an execution button 2130, the device status list controller 1217 reflects the changed device status to update the device status list.

Figure 22:
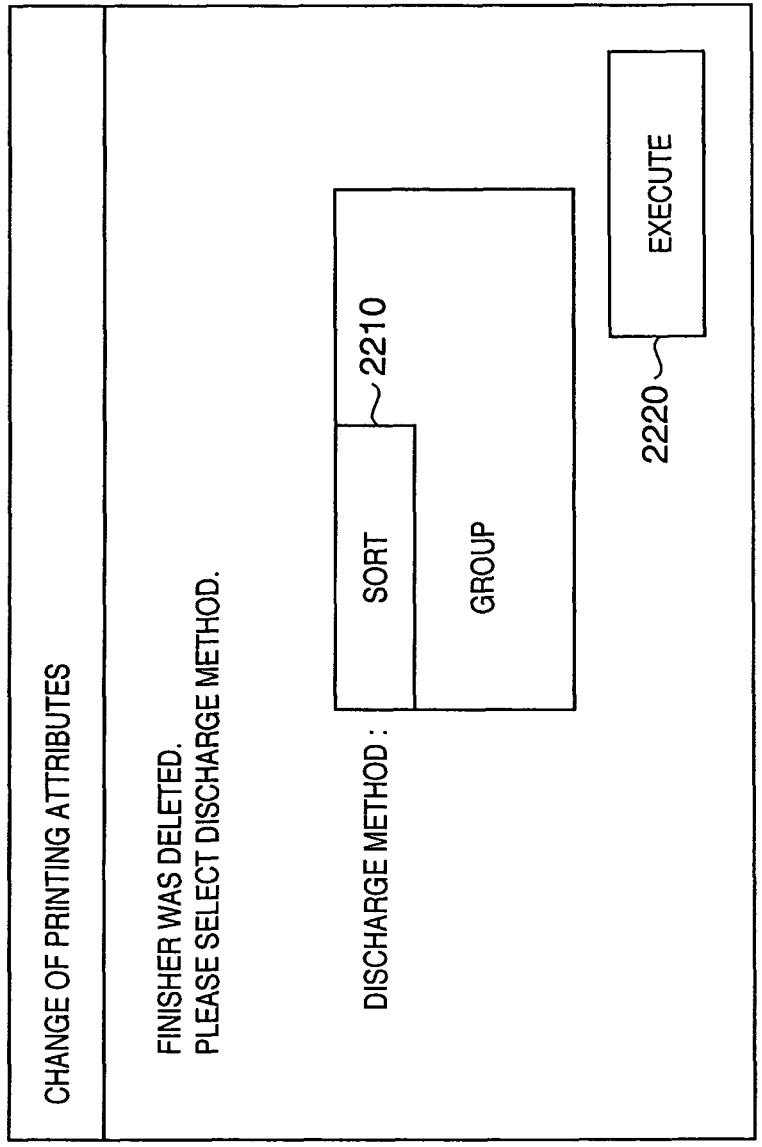
FIG. 22 is a view showing a UI for reflecting deletion of a finisher.

FIG. 22 shows a UI for reflecting deletion of a finisher. Since the finisher is demounted, "notation of staple" (see 1803 in FIG. 18) as a finisher function is deleted, and sorting 2210 or the like executable by a single printer becomes selectable. When the user presses an execution button 2220 while selecting a discharge method, the device status list controller 1217 reflects the changed device status to update the device status list. When there is only one choice upon a change of the status, the device status list controller 1217 can automatically update the device status list by, for example, displaying a warning message. The device status list controller 1217 can determine whether the settings of printing attributes become inconsistent with the changed device status. If the printing attributes become inconsistent with the changed device status, the device status list controller 1217 can notify the user of an abnormal state by displaying a warning message or the like. The job ticket controller 1206 can also create again a job ticket having no target printing attribute.

Even when the printing attributes of a hot folder become inconsistent with the current device status information upon a change of the current device status information, the first embodiment can make the printing attributes consistent with the current device status information by updating the printing attributes in accordance with the change of the status information and creating a device status list again.

The first embodiment can provide an information processing technique capable of dynamically coping with a change of the device status (addition/change of settings, demounting of a device, or the like).

The first embodiment can dynamically cope with a change of the device status and a change of resources, prevent an output result not intended by the user, and achieve information processing for efficient printing.

(Second Embodiment)

The second embodiment will describe processing to create a hot folder not by a hot folder application but by a printer driver.

Figure 23:
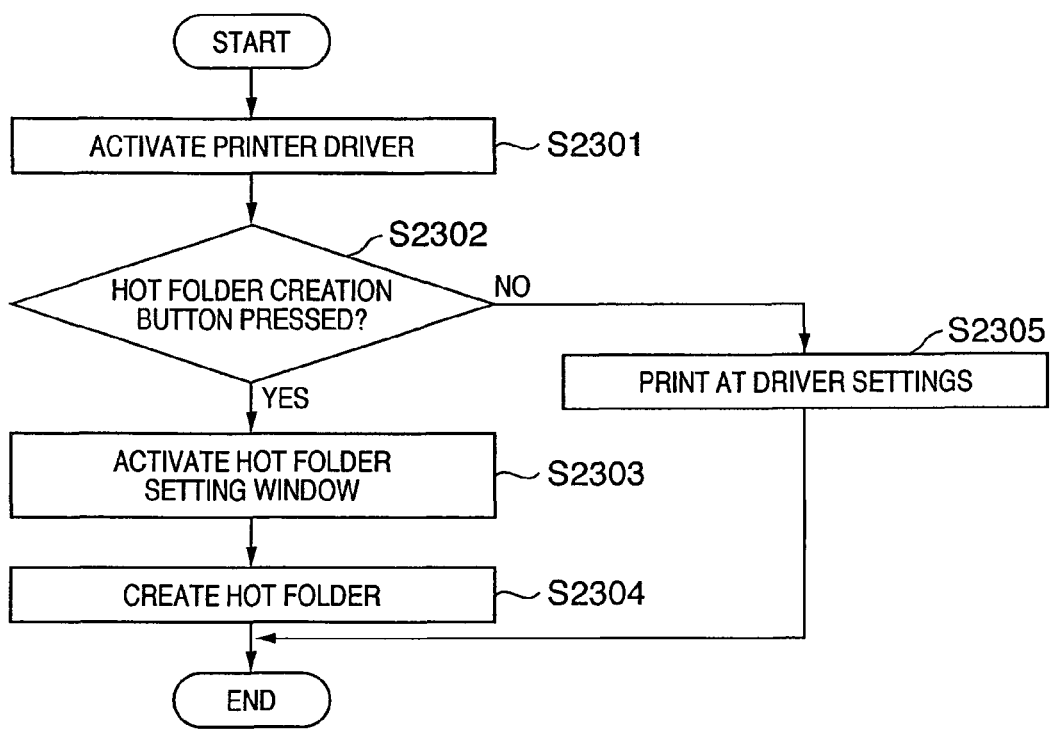
FIG. 23 is a flowchart for explaining processing procedures to create a hot folder from a printer driver.

FIG. 23 is a flowchart for explaining processing procedures to create a hot folder from the printer driver.

In step S2301, the printer driver in a host computer starts up. In response to the startup of the printer driver, a CRT 110 displays a UI for creating a hot folder.

In step S2302, the printer driver determines whether the user presses a hot folder creation button (not shown) from the UI displayed in response to the startup of the printer driver.

If the user does not press the hot folder creation button (NO in S2302), the process advances to step S2305 to print in accordance with the settings of the printer driver (S2305).

If the printer driver determines in step S2302 that the user presses the hot folder creation button (YES in S2302), the process advances to step S2303, and the printer driver activates a hot folder setting window (S2303). The activated hot folder setting window is, e.g., the dialog shown in FIG. 6. This window allows the user to designate the folder path of a target folder set as a hot folder, and a target printer.

In step S2304, the printer driver creates a hot folder in accordance with contents set from the hot folder setting window. A created hot folder and hot folder processing after inputting a job are the same as the contents described in the first embodiment. The printer driver creates a job ticket (FIG. 9) and a device status list (FIGS. 14B and 15). If the device status has changed, a job ticket management table 1203 and device status list management table 1216 are updated under the control of the printer driver in accordance with the flowchart of FIG. 16.

Figure 24:
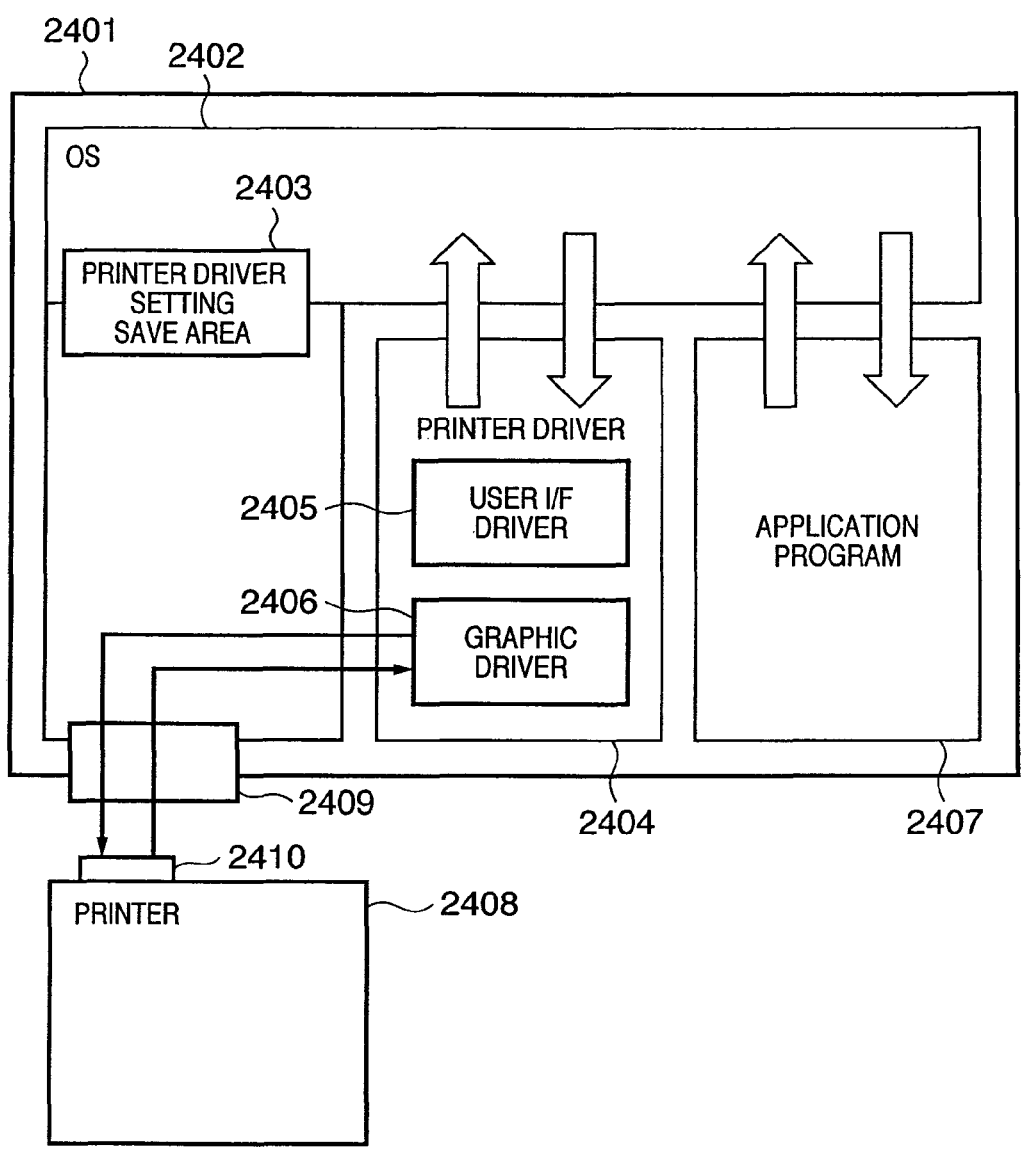
FIG. 24 is a block diagram showing the arrangement of software in a host computer including the printer driver.

FIG. 24 is a block diagram showing the arrangement of software in a host computer including the printer driver. An OS 2402 is installed in a host computer 2401. A printer driver 2404 and application program 2407 are installed on the OS 2402 and controlled by it.

The printer driver 2404 includes a user I/F (UI) driver 2405 which displays a user I/F (UI) and saves settings. The printer driver 2404 includes a graphic driver 2406 which converts a print drawing instruction issued from the application program 2407 via the OS 2402 into a code interpretable by a printer. The UI driver 2405 displays a print setting dialog and property sheet when the application program 2407 designates print settings via the OS 2402. Examples of the print setting dialog and property sheet will be omitted.

A printer driver setting save area 2403 exists in a save area managed by the OS 2402, and saves printing attributes set by the user via the UI driver 2405. The UI driver 2405, graphic driver 2406, and application program 2407 can access the printer driver setting save area 2403 via the OS 2402 and read printing attributes set by the user.

A communication I/F 2409 of the host computer 2401 and a communication I/F 2410 of a printer 2408 connect to each other via a communication medium such as a network. The graphic driver 2406 can transmit print data to the printer 2408 via the OS 2402, and obtain status information of the printer 2408 via the OS 2402.

(Relationship Between Hot Folder and Printer Driver)

Figure 25:
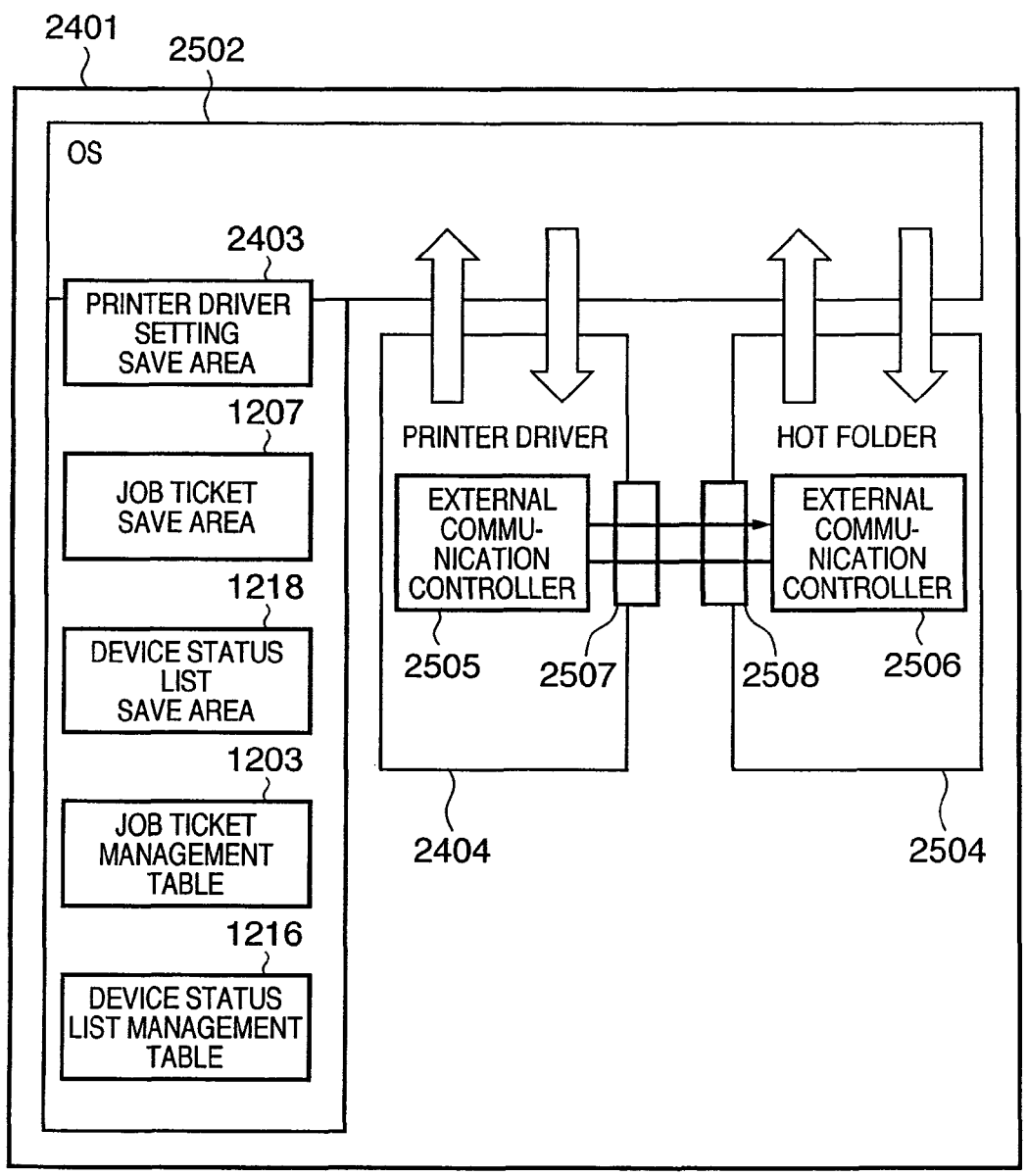
FIG. 25 is a block diagram showing the relationship between the hot folder and the printer driver.

FIG. 25 is a block diagram showing the relationship between the hot folder and the printer driver. An OS 2502 comprises a job ticket save area 1207 for saving a generated job ticket and a device status list save area 1218 for saving a device status list, in addition to the printer driver setting save area 2403 in FIG. 24. The printer driver 2404 generates a job ticket to be saved in the job ticket save area 1207 and a device status list to be saved in the device status list save area 1218.

To communicate with a hot folder 2504, the printer driver 2404 comprises an external communication controller 2505 and export function 2507. Similarly, the hot folder 2504 comprises an external communication controller 2506 and export function 2508, and can communicate with the printer driver 2404 via them. This arrangement allows the printer driver 2404 and hot folder 2504 to exchange instructions and information in accordance with specified procedures and data structures.

Figure 16:
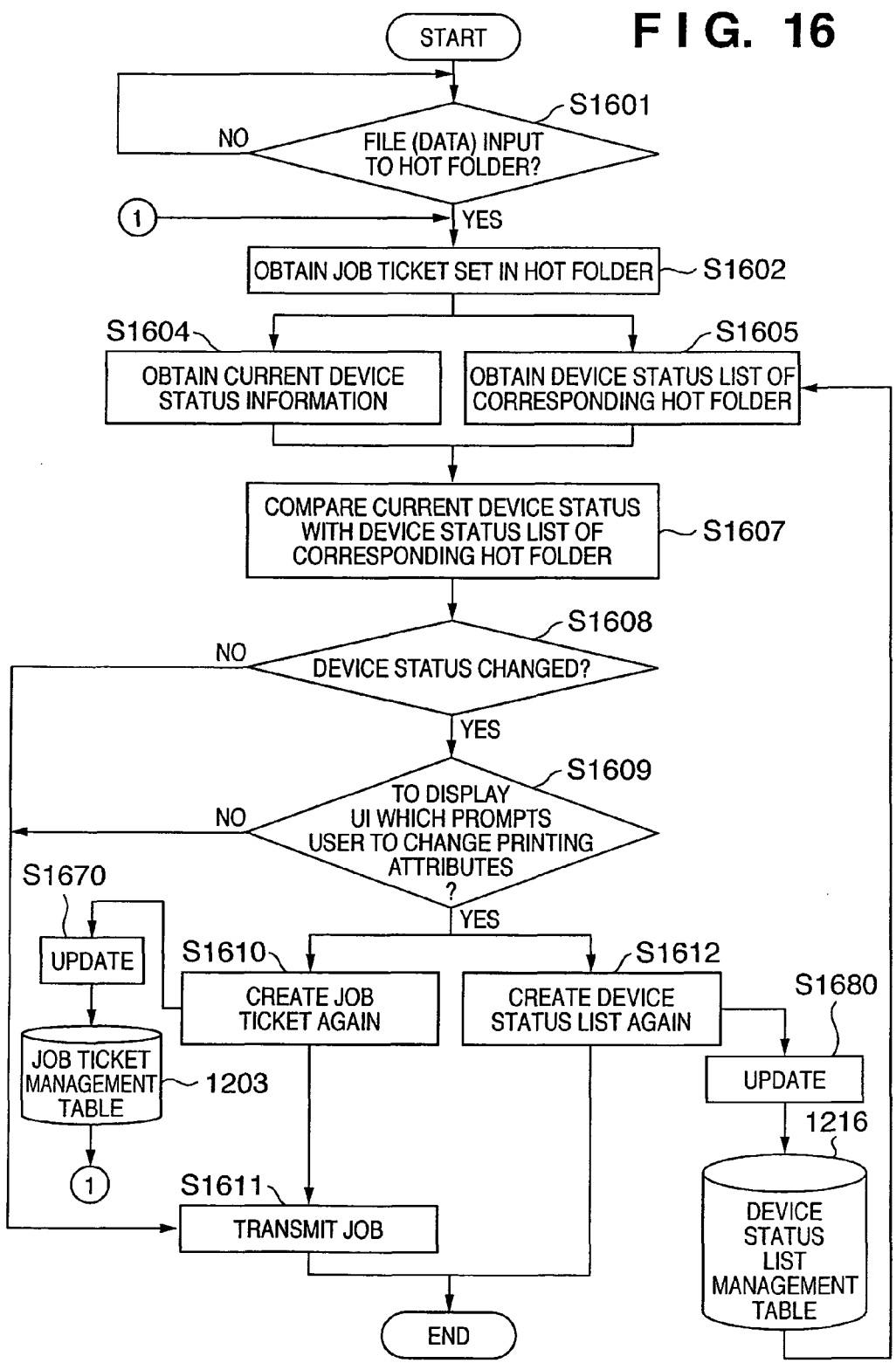
FIG. 16 is a flowchart for explaining hot folder processing procedures according to the first embodiment of the present invention.

Processing for a file (data) input to a hot folder generated by the printer driver 2404 is the same as the flowchart of FIG. 16 described in the first embodiment, and a detailed description thereof will be omitted.

Note that the printer driver 2404 may incorporate a job ticket management table 1203 and device status list management table 1216 to be looked up in the processing of FIG. 16. Alternatively, the job ticket management table 1203 and device status list management table 1216 may be set on the OS 2502, as shown in FIG. 25. When the job ticket management table 1203 and device status list management table 1216 are set on the OS 2502, the printer driver 2404 can look up these tables via the OS 2502.

If the device status changes, the printer driver 2404 creates a job ticket and device status list again on the basis of a change of printing attributes corresponding to the change of the device status. The printer driver 2404 updates the job ticket management table 1203 and device status list management table 1216 on the basis of the re-created job ticket and device status list.

The second embodiment can provide an information processing technique capable of dynamically coping with a change of the device status (addition/change of settings, demounting of a device, or the like) using the printer driver as a processing entity.

The second embodiment can dynamically cope with a change of the device status and a change of resources, prevent an output result not intended by the user, and achieve information processing for efficient printing.

(Third Embodiment)

The third embodiment will describe a case of applying the present invention to "favorite settings" saved as printing attributes designated by the user.

Figure 27:
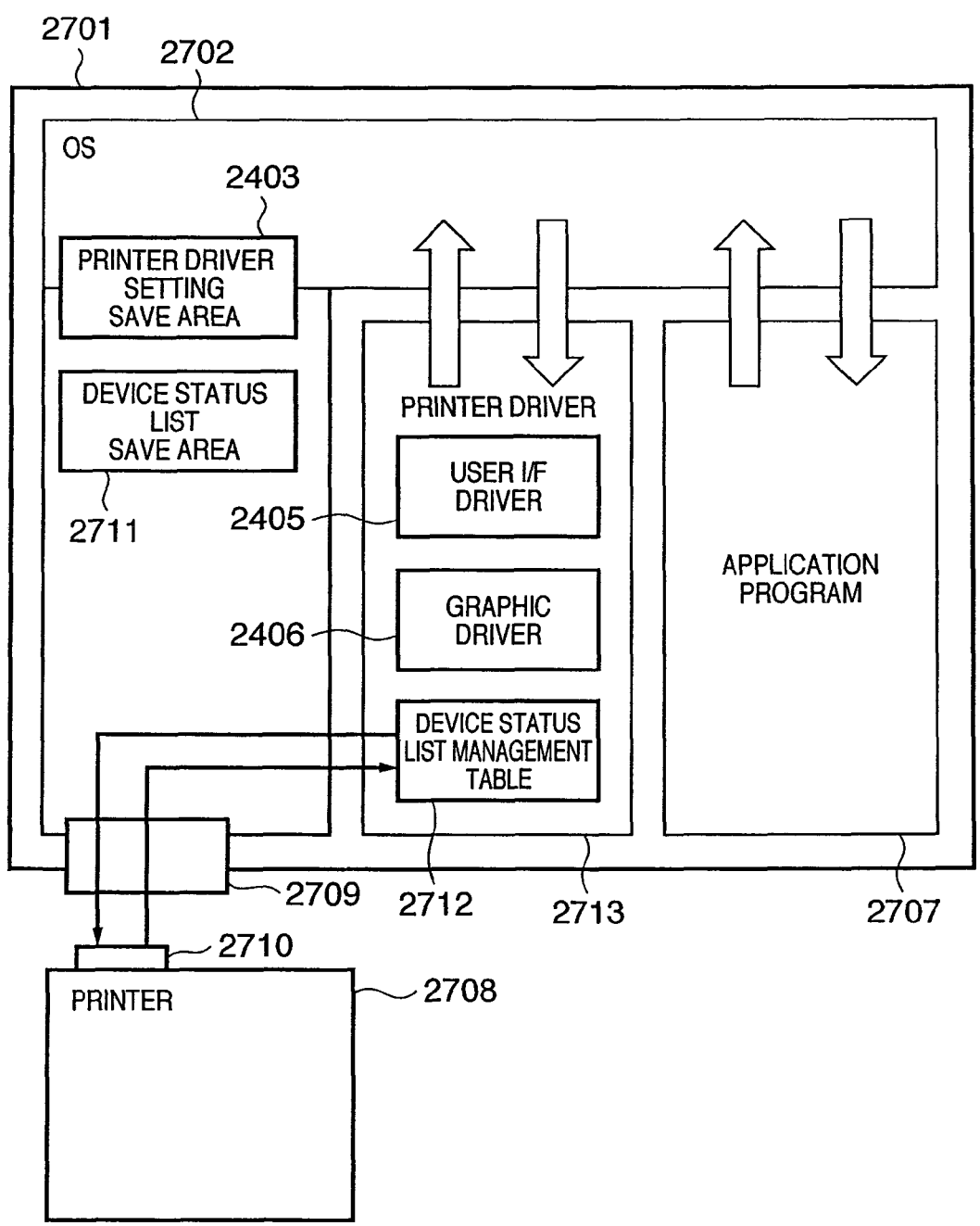
FIG. 27 is a block diagram showing the arrangement of software in the host computer including the printer driver.

FIG. 27 is a block diagram showing the arrangement of software in a host computer including a printer driver.

A printer driver 2713 and application program 2707 are installed in a host computer 2701 and controlled by an OS 2702.

Similar to the arrangement in FIG. 24, the printer driver 2713 includes a user I/F (UI) driver 2405 which displays a user I/F (UI) and saves settings. The printer driver 2713 includes a graphic driver 2406 which converts a print drawing instruction issued from an application program 2407 via an OS 2402 into a code interpretable by a printer. Further, the printer driver 2713 includes a device status list management table 2712. The device status list management table 2712 can manage a device status list based on device status information obtained from a printer 2708.

FIG. 31 is a table illustrating a device status list management table set in the printer driver 2713 in the third embodiment. In FIG. 31, the device status list management table makes a printing attribute 3101 set by the user, a target printer 3102, and a device status list 3103 based on device status information correspond to each other. For example, when reading out a given printing attribute as "favorite" information, the printer driver 2713 can specify address information (e.g., IP address) for specifying a corresponding target printer and a device status list corresponding to the printing attribute.

A device status list save area 2711 is set on the OS 2702 in addition to a printer driver setting save area 2403. The device status list save area 2711 saves, via the OS 2702, a device status list (e.g., FIG. 15) based on device status information obtained by the printer driver 2713.

The printer driver setting save area 2403 saves printing attributes set as "favorites" by the user from the printer driver 2713. The printer driver 2713 can manage to save and update the set printing attributes ("favorite" information) via the OS 2402.

The printer driver 2713 manages printing attributes ("favorite" information) set by the user as attribute information different from information obtained from a device.

Figure 28:
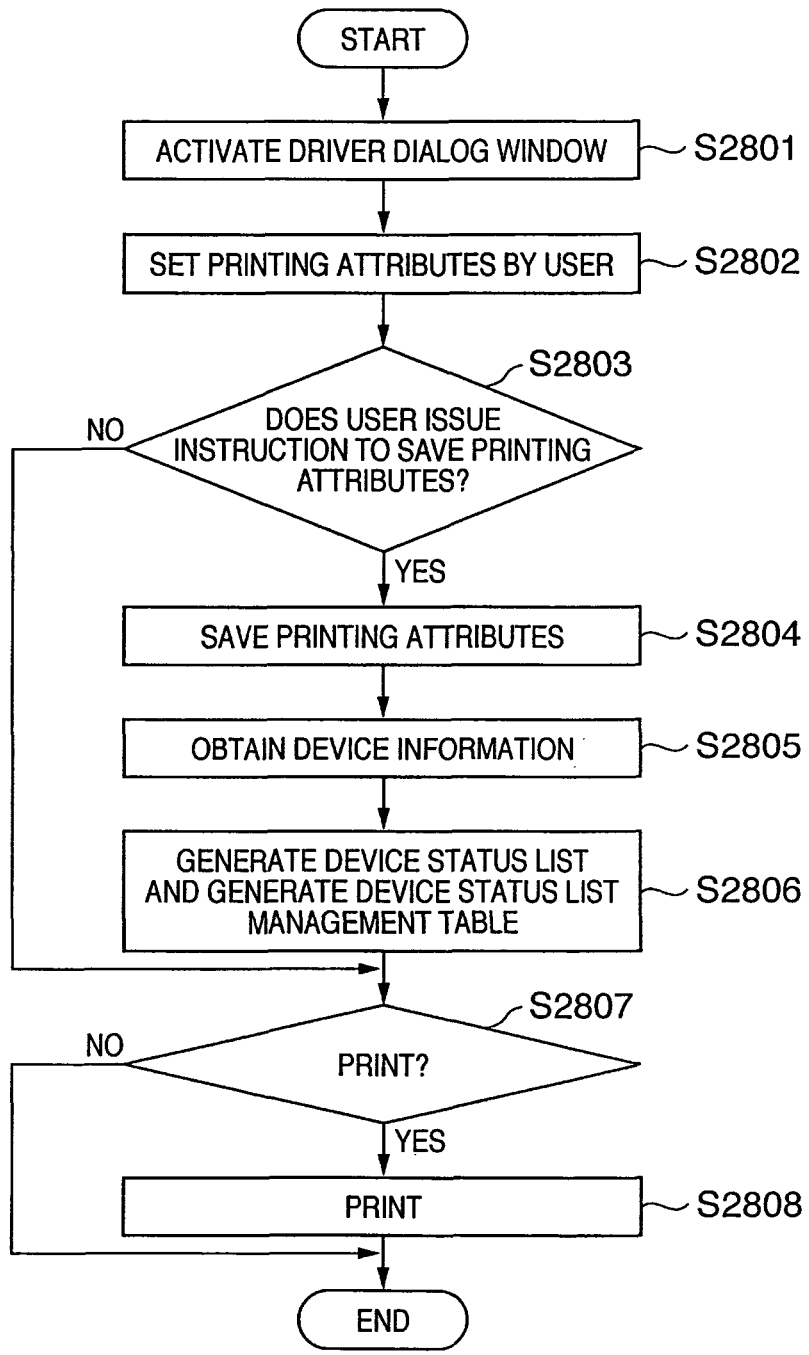
FIG. 28 is a flowchart for explaining processing procedures to save "favorite" information, obtain device status information, and generate a device status list management table under the control of the printer driver.

FIG. 28 is a flowchart for explaining processing procedures to save "favorite" information, obtain device status information, and generate a device status list management table under the control of the printer driver 2713.

In step S2801, the printer driver 2713 activates its dialog window. In step S2802, the user sets printing attributes. The printing attributes serve as "favorite" information set by the user.

In step S2803, the printer driver 2713 determines whether the user designates to save the printing attributes ("favorite" information) set in step S2802. If the printer driver 2713 determines in step S2803 that the user does not designate to save the printing attributes ("favorite" information) (NO in S2803), the process advances to step S2807. If printing is to be executed (YES in S2807), the process advances to step S2808 to print.

If the printer driver 2713 determines in step S2803 that the user designates to save the printing attributes ("favorite" information) (YES in S2803), the process advances to step S2804. The printer driver 2713 saves the printing attributes ("favorite" information) in the printer driver setting save area 2403 via the OS 2702.

In step S2805, the printer driver 2713 obtains device information of a device (printer) 2408. Assume that a communication I/F 2709 of the host computer 2701 and a communication I/F 2710 of the printer 2408 connect to each other via a communication medium such as a network. The printer driver 2713 can transmit print data to the printer 2408 via the OS 2702. The printer driver 2713 can also obtain status information of the printer 2408 via the OS 2702.

Referring back to FIG. 28, the printer driver 2713 generates a device status list and device status list management table in step S2806. These processes correspond to step S1308 of FIG. 13.

In step S2807, the printer driver 2713 determines whether to print. If no printing is to be executed (NO in S2807), the process ends. If printing is to be executed (YES in S2807), the process advances to step S2808 to print (S2808), and then ends.

Figure 29:
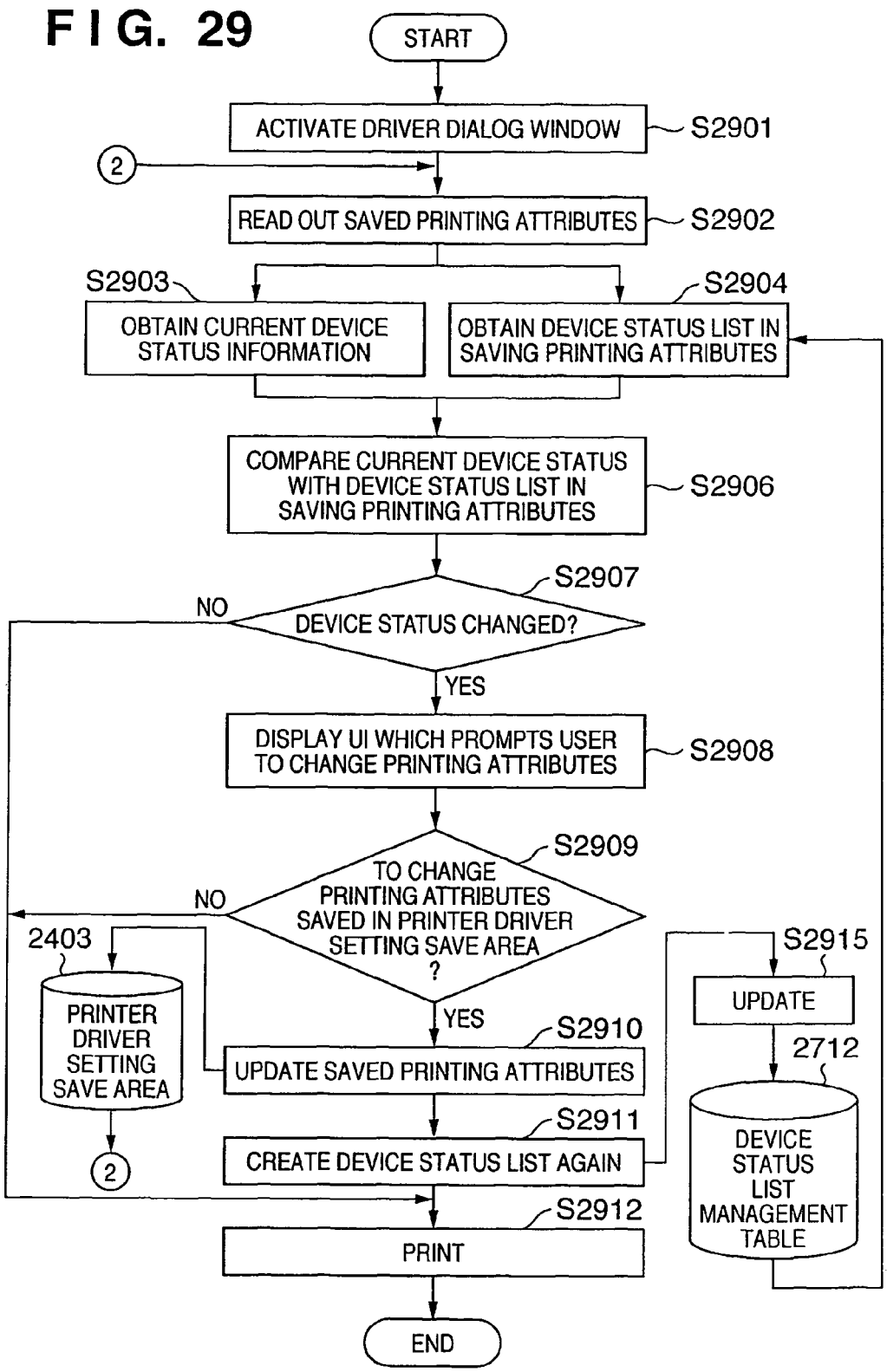
FIG. 29 is a flowchart for explaining print processing procedures based on printing attributes ("favorite" information) set by the user and information obtained from a device.

FIG. 29 is a flowchart for explaining print processing procedures based on printing attributes ("favorite" information) set by the user and information obtained from a device. This processing is executed under the control of the printer driver 2713.

In step S2901, a CRT 110 displays the dialog window of the printer driver 2713.

In step S2902, the printer driver 2713 reads out printing attributes ("favorite" information) saved in the printer driver setting save area 2403.

In step S2903, the printer driver 2713 obtains the current device status information.

In step S2904, the printer driver 2713 searches the device status list management table 2712 on the basis of the readout printing attributes, obtaining a device status list in saving the printing attributes ("favorite" information) set by the user. For example, when the printing attribute A 3101 is read out in FIG. 31, the printer driver 2713 obtains the corresponding device status list (device_A_001) 3103.

In step S2906, the printer driver 2713 compares the current device status information with the device status information in saving the "favorite" information.

If the two pieces of status information match each other in step S2907, the printer driver 2713 determines that the device status has not changed. If the device status has not changed (NO in S2907), the process advances to step S2912 to print (S2912).

If the printer driver 2713 determines in step S2907 that the device status information in saving the "favorite" information does not match the current device status information, it determines that the device status has changed.

Figure 30:
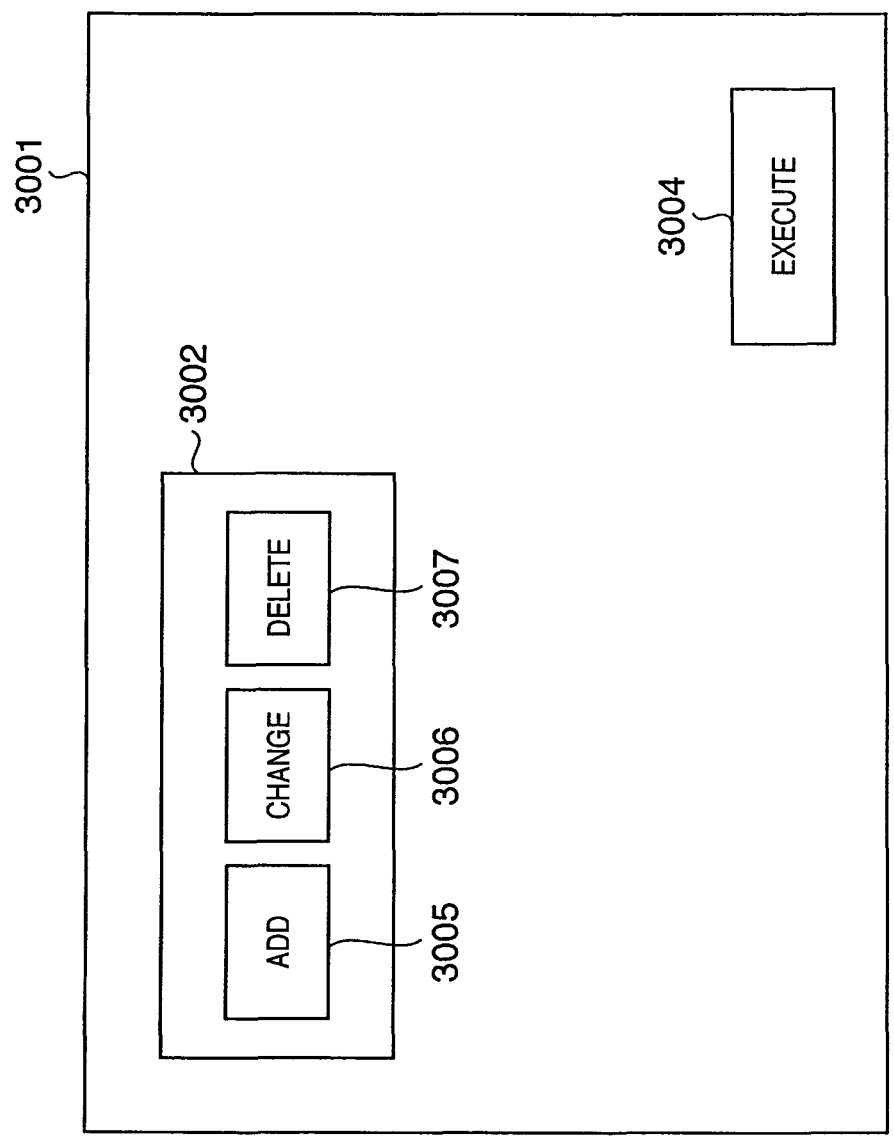
FIG. 30 is a view illustrating a UI 3001 displayed in step S2908.

If the device status has changed (YES in S2907), the process advances to step S2908. Under display control of the printer driver 2713, the CRT 110 displays a user interface (UI) 3001 which prompts the user to change printing attributes FIG. 30 is a view illustrating the UI 3001 displayed in step S2908. The UI 3001 has a printing attribute changing portion 3002 for changing printing attributes ("favorite" information) set by the user. The printing attribute changing portion 3002 allows setting contents associated with printing attribute addition 3005, printing attribute change 3006, and printing attribute deletion 3007.

The user sets printing attributes from the printing attribute changing portion 3002 using the printing attribute addition 3005 to printing attribute deletion 3007, and presses an execution button 3004, finalizing the set printing attributes.

If the user changes printing attributes ("favorite" information) from the printing attribute changing portion 3002 (YES in S2909), the process advances to step S2910. The printer driver 2713 updates the printing attributes ("favorite" information) saved in the printer driver setting save area 2403 (S2910). The printer driver 2713 reflects the update results in printing attributes saved in the printer driver setting save area 2403. In the next read, the updated printing attributes are read out.

If the printer driver 2713 determines in step S2909 that the user does not change the printing attributes (NO in S2909), the process advances to step S2912 to print (S2912).

If the printer driver 2713 updates the printing attributes ("favorite" information) saved in the printer driver setting save area 2403 in step S2910, the process advances to step S2911. The printer driver 2713 creates again a device status list corresponding to the change of the printing attributes. The printer driver 2713 updates the device status list management table 2712 on the basis of the re-created device status list (S2915).

After the end of processing in step S2911, the process advances to step S2912 to execute print processing which reflects the changed printing attributes (S2912), and then ends.

The third embodiment has exemplified "favorite" information as an example of printing attributes set by the user, but the gist of the present invention is not limited to this example. For example, the present invention may target information on printing attributes settable by the user, separately from status information obtained from a device.

Even when saved printing attributes become inconsistent with the current device status information upon a change of the current device status information, the third embodiment can make the printing attributes consistent with the current device status information by updating the printing attributes in accordance with the change of the status information and creating a device status list again.

The third embodiment can provide an information processing technique capable of dynamically coping with a change of the device status (e.g., a change of information containing at least one of pieces of information on addition/change of settings in the printer and demounting of a device).

The third embodiment can flexibly cope with a change of the device status and a change of resources (e.g., a device configuration typified by the image forming program or image forming circuit of a device, or an option such as a finisher for a device). The third embodiment can prevent an output result not intended by the user, and implement information processing for efficient printing.

(Fourth Embodiment)

The fourth embodiment will describe a case of switching whether or not to compare device statuses when a hot folder receives a job. The fourth embodiment defines "dynamic configuration" which is processing to compare the current device status with a device status in creating a hot folder by using a device status list described in the first embodiment, and when the device status has changed, display a UI which prompts the user to change printing attributes.

Figure 32:
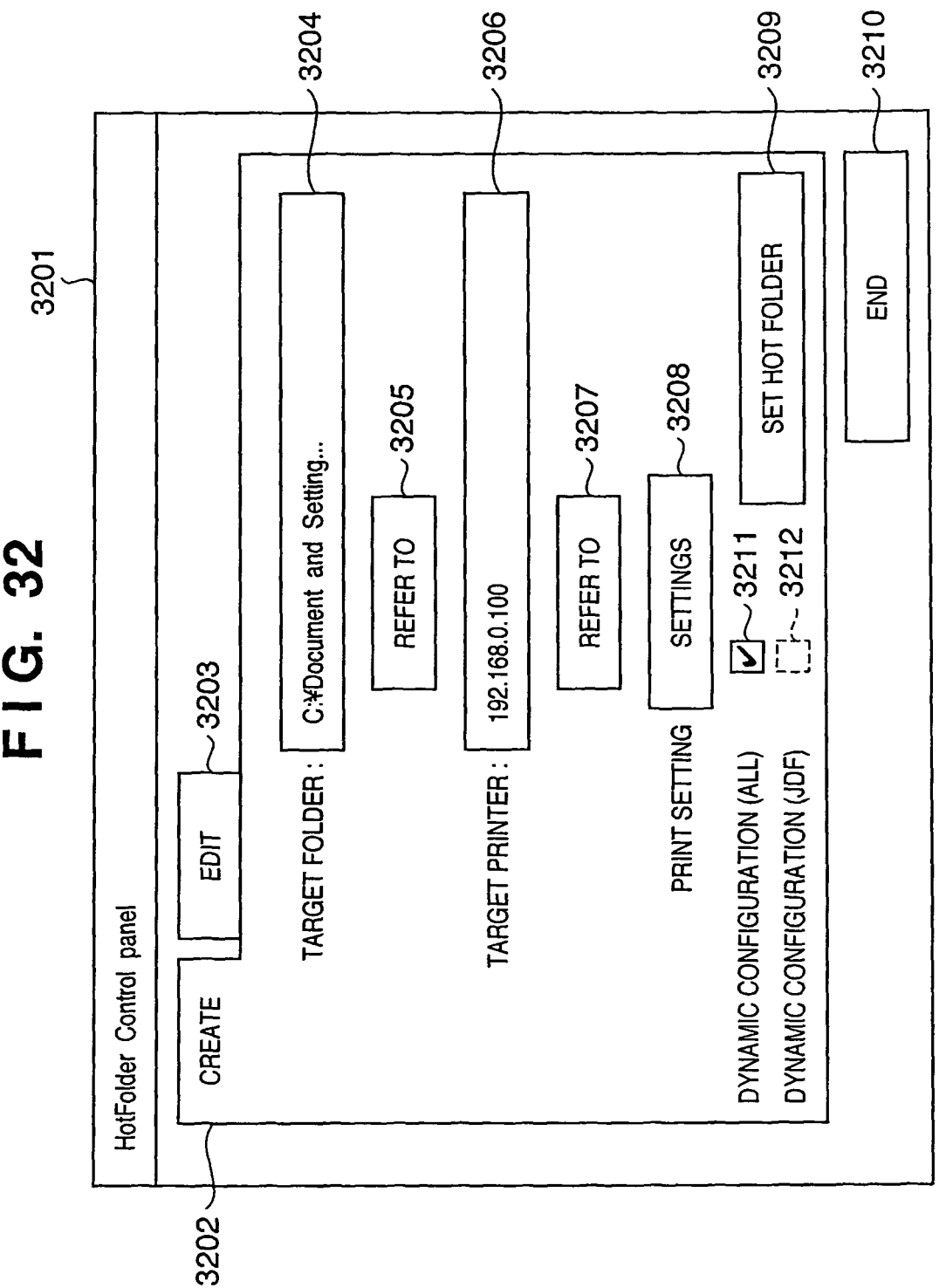
FIG. 32 is a view showing an example of a dialog displayed when a hot folder application starts up in the fourth embodiment.

FIG. 32 is a view showing an example of a dialog displayed when a hot folder application starts up in the fourth embodiment. Reference numerals 3201 to 3210 in FIG. 32 are identical to reference numerals 601 to 610 in FIG. 6, and a description thereof will be omitted. A dynamic configuration (all) check box 3211 is used to switch whether or not to execute dynamic configuration for all data. If the dynamic configuration (all) check box 3211 is checked, the same processing as that in the first embodiment is executed. If the dynamic configuration (all) check box 3211 is not checked, general hot folder processing is executed without performing the processing in the first embodiment. A dynamic configuration (JDF) check box 3212 is used to switch whether or not to execute dynamic configuration for only JDF documents. If the dynamic configuration (JDF) check box 3212 is checked, it is determined whether input data has the JDF. If the input data does not have any JDF, general hot folder processing is executed; if the input data has the JDF, a device status list described in the first embodiment is compared with the current device status information. The dynamic configuration (all) check box 3211 contains the contents of the dynamic configuration (JDF) check box 3212. Thus, when the dynamic configuration (all) check box 3211 is checked, the dynamic configuration (JDF) check box 3212 is grayed out. Only a JDF document has been exemplified, but any condition can be set as a dynamic configuration condition. The number of conditions is not limited to two and is arbitrary.

Figure 33:
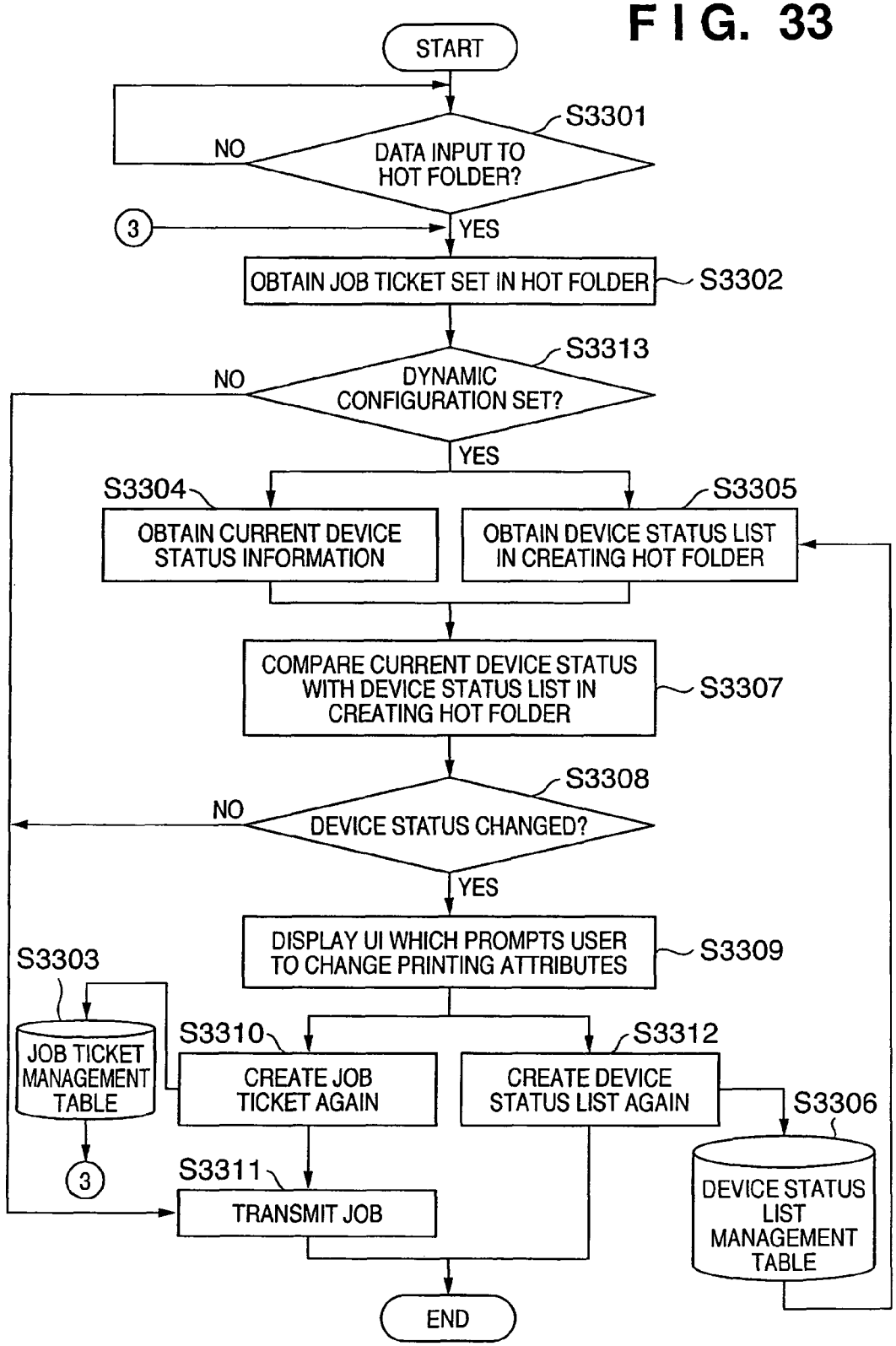
FIG. 33 is a flowchart for explaining hot folder processing procedures in the fourth embodiment of the present invention.

Processing procedures according to the fourth embodiment will be explained with reference to FIG. 33. S3301 to S3312 are the same processes as those in S1601 to S1612, S1670 and S1680 of FIG. 16, and a description thereof will be omitted. After a job ticket set in a hot folder is obtained in S3302, it is determined in S3313 whether dynamic configuration is set. If no dynamic configuration is set, the job is transmitted in S3311. If dynamic configuration is set, the current device status information is obtained in S3304, and a device status list in creating a hot folder is obtained in S3305 to perform subsequent processing.

FIG. 34 shows detailed procedures in step S3313. After a job ticket set in a hot folder is obtained in S3302, it is determined in S3401 whether dynamic configuration is set for all data. If dynamic configuration is set for all data, the current device status information is obtained in S3304, and a device status list in creating a hot folder is obtained in S3305 to perform subsequent processing. If dynamic configuration is not set for all data, it is determined in S3402 whether dynamic configuration is set for JDF documents. If no dynamic configuration is set, the job is transmitted in S3311. If dynamic configuration is set for JDF documents, it is determined in S3403 whether the input data is a JDF document. If the data is not a JDF document, the job is transmitted in S3311. If the data is a JDF document, the current device status information is obtained in S3304, and a device status list in creating a hot folder is obtained in S3305 to perform subsequent processing.

The procedures described in the fourth embodiment are merely an example, and the processing can take any form as far as the processing switches whether or not to execute dynamic configuration.

Even when saved printing attributes become inconsistent with the current device status information upon a change of the current device status information, the fourth embodiment can make the printing attributes consistent with the current device status information by updating the printing attributes in accordance with the change of the status information and creating a device status list again.

The fourth embodiment can provide an information processing technique capable of dynamically coping with a change of the device status (e.g., a change of information containing at least one of pieces of information on addition/change of settings in the printer and demounting of a device).

The fourth embodiment can flexibly cope with a change of the device status and a change of resources (e.g., a device configuration typified by the image forming program or image forming circuit of a device, an option such as a finisher for the device, or the like). The fourth embodiment can prevent an output result not intended by the user, and implement information processing for efficient printing.

(Other Embodiment)

The objects of the present invention are also achieved by supplying a storage medium which records software program codes that implement the functions of the above-described embodiments to a system or apparatus. The objects of the present invention are also achieved by reading out and executing the program codes stored in the storage medium by the computer (CPU or MPU) of the system or apparatus.

In this case, the program codes read out from the storage medium implement the functions of the above-described embodiments, and the storage medium which stores the program codes constitutes the present invention.

The storage medium for supplying the program codes includes, e.g., a flexible disk, hard disk, optical disk, magnetooptical disk, CD-ROM, CD-R, nonvolatile memory card, and ROM.

The functions of the above-described embodiments are implemented by executing the readout program codes by the computer. Also, the functions of the above-described embodiments are implemented by performing some or all of actual processes by an OS (Operating System) or the like running on the computer on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-299322, filed on Oct. 13, 2005, which is hereby incorporated by reference herein in its entirety.

What is claimed is:

1. An information processing apparatus which generates print data to be processed by a printing apparatus from a document file in accordance with a set printing attribute, said apparatus comprising:
a setting unit which sets a printing attribute to a hot folder;
a detecting unit which detects that the document file is stored in the hot folder;
an obtaining unit which obtains status information indicating a state of the printing apparatus associated with the hot folder in which the document file is stored, when the detecting unit detects that the document file is stored in the hot folder;
a determining unit which determines whether the state of the printing apparatus associated with the hot folder in which the document file is stored is modified from a state of the printing apparatus at a time when the setting unit has set the printing attribute to the hot folder;
a displaying unit which displays a user interface screen for changing the printing attribute which has been set to the hot folder in which the document file is stored, if the determining unit which determines that the state of the printing apparatus associated with the hot folder in which the document file is stored is modified, wherein a printing attribute added by the modification of the state of the printing apparatus becomes possible to be selected in the user interface screen, and a printing attribute deleted by the modification of the state of the printing apparatus becomes impossible to be selected in the user interface screen; and
a transferring unit which transfers the print data based on the document file and the printing attribute which is changed via the user interface screen displayed by the displaying unit if the determining unit determines that the state of the printing apparatus associated with the hot folder in which the document file is stored is modified, and transfers the print data based on the document file and the printing attribute which is not changed if the determining unit determines that the state of the printing apparatus associated with the hot folder in which the document file is stored is not modified.

2. The apparatus according to claim 1, wherein the displaying unit updates the print attribute set by the hot folder to the changed print attribute.

3. The apparatus according to claim 1, wherein the displaying unit displays, in the user interface screen, a confirmation interface for confirming a change of the printing attribute before the printing attribute is changed via the user interface screen,
wherein when the printing attribute is not changed via the user interface screen displayed by the displaying unit, the transferring unit transfers the print data based on the document file and the printing attribute without changing even if the determining unit determines that the state of the printing apparatus associated with the hot folder in which the document file is stored is modified.

4. The apparatus according to claim 3, wherein said displaying unit displays, as a change item, at least one of addition and change of a setting of the printing attribute, and presence/absence of a device connected to the printing apparatus.

5. The apparatus according to claim 1, wherein the printing attribute includes a setting of a printer driver which generates the print data.

6. The apparatus according to claim 1, wherein the status information includes at least one of pieces of information on addition and change of a setting in the printing apparatus.

7. The apparatus according to claim 1, further comprising a determination unit which determines whether print data contains an obtaining instruction,
wherein when said determination unit determines that the print data contains the obtaining instruction, said obtaining unit obtains the status information.

8. An information processing method executed by an information processing apparatus which generates print data to be processed by a printing apparatus from a document file in accordance with a set printing attribute, said method comprising:
a setting step of setting a printing attribute to a hot folder;
a detecting step of detecting that the document file is stored in the hot folder;
an obtaining step of obtaining status information indicating a state of the printing apparatus associated with the hot folder in which the document file is stored, when the detecting step detects that the document file is stored in the hot folder;
a determining step of determining whether the state of the printing apparatus associated with the hot folder in which the document file is stored is modified from a state of the printing apparatus at a time when the setting unit has set the printing attribute to the hot folder;
a displaying step of displaying a user interface screen for changing the printing attribute which has been set to the hot folder in which the document file is stored, if the determining step determines that the state of the printing apparatus associated with the hot folder in which the document file is stored is modified, wherein a printing attribute added by the modification of the state of the printing apparatus becomes possible to be selected in the user interface screen, and a printing attribute deleted by the modification of the state of the printing apparatus becomes impossible to be selected in the user interface screen; and
a transferring step of transferring the print data based on the document file and the printing attribute which is changed via the user interface screen displayed in the displaying step if the determining step determines that the state of the printing apparatus associated with the hot folder in which the document file is stored is modified, and transferring the print data based on the document file and the printing attribute which is not changed if the determining step determines that the state of the printing apparatus associated with the hot folder in which the document file is stored is not modified.

9. The method according to claim 8, wherein the displaying step updates the print attribute set by the hot folder.

10. The method according to claim 8, wherein the displaying step displays, in the user interface screen, a confirmation interface for confirming a change of the printing attribute before the printing attribute is changed via the user interface screen,
wherein when the printing attribute is not changed via the user interface screen displayed by the displaying unit, the transferring step transfers the print data based on the document file and the printing attribute without changing even if the determining step determines that the state of the printing apparatus associated with the hot folder in which the document file is stored is modified.

11. The method according to claim 10, wherein said displaying step displays, as a change item, at least one of addition and change of a setting of the printing attribute, and presence/absence of a device connected to the printing apparatus.

12. The method according to claim 8, wherein the printing attribute includes a setting of a printer driver which generates the print data.

13. The method according to claim 8, wherein the status information includes at least one of pieces of information on addition and change of a setting in the printing apparatus.

14. The method according to claim 8, further comprising a determination step of determining whether print data contains an obtaining instruction,
wherein when said determination step determines that the print data contains the obtaining instruction, said obtaining step obtains the status information.

15. A non-transitory computer-readable storage medium storing an information processing program that causes a computer to execute an information processing method executed by an information processing apparatus which generates print data to be processed by a printing apparatus from a document file in accordance with a set printing attribute, the method comprising:
a setting step of setting a printing attribute to a hot folder;
a detecting step of detecting that the document file is stored in the hot folder;
an obtaining step of obtaining status information indicating a state of the printing apparatus associated with the hot folder in which the document file is stored, when the detecting step detects that the document file is stored in the hot folder;
a determining step of determining whether the state of the printing apparatus associated with the hot folder in which the document file is stored is modified from a state of the printing apparatus at a time when the setting unit has set the printing attribute to the hot folder;
a displaying step of displaying a user interface screen for changing the printing attribute which has been set to the hot folder in which the document file is stored, if the determining step determines that the state of the printing apparatus associated with the hot folder in which the document file is stored is modified, wherein a printing attribute added by the modification of the state of the printing apparatus becomes possible to be selected in the user interface screen, and a printing attribute deleted by the modification of the state of the printing apparatus becomes impossible to be selected in the user interface screen; and
a transferring step of transferring the print data based on the document file and the printing attribute which is changed via the user interface screen displayed in the displaying step if the determining step determines that the state of the printing apparatus associated with the hot folder in which the document file is stored is modified, and transferring the print data based on the document file and the printing attribute which is not changed if the determining step determines that the state of the printing apparatus associated with the hot folder in which the document file is stored is not modified.

16. The non-transitory computer-readable storage medium according to claim 15, wherein the displaying step updates the print attribute set by the hot folder.

17. The non-transitory computer-readable storage medium according to claim 15, wherein the displaying step displays, in the user interface screen, a confirmation interface for confirming a change of the printing attribute before the printing attribute is changed via the user interface screen, wherein when the printing attribute is not changed via the user interface screen displayed by the displaying unit, the transferring step transfers the print data based on the document file and the printing attribute without changing even if the determining step determines that the state of the printing apparatus associated with the hot folder in which the document file is stored is modified.

18. The non-transitory computer-readable storage medium according to claim 17, wherein said displaying step displays, as a change item, at least one of addition and change of a setting of the printing attribute, and presence/absence of a device connected to the printing apparatus.

19. The non-transitory computer-readable storage medium according to claim 15, wherein the printing attribute includes a setting of a printer driver which generates the print data.

20. The non-transitory computer-readable storage medium according to claim 15, wherein the status information includes at least one of pieces of information on addition and change of a setting in the printing apparatus.

21. The non-transitory computer-readable storage medium according to claim 15, further comprising a determination step of determining whether print data contains an obtaining instruction, wherein when said determination step determines that the print data contains the obtaining instruction, said obtaining step obtains the status information.

* * * * *